United States Patent
Panneer et al.

(10) Patent No.: US 12,360,823 B2
(45) Date of Patent: Jul. 15, 2025

(54) DYNAMIC RESOURCE MANAGEMENT MECHANISM

(71) Applicant: Intel Corporation, Santa Clara, CA (US)

(72) Inventors: Selvakumar Panneer, Portland, OR (US); Pradeep Pappachan, Tualatin, OR (US); Reshma Lal, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 737 days.

(21) Appl. No.: 17/133,716

(22) Filed: Dec. 24, 2020

(65) Prior Publication Data

US 2021/0117247 A1 Apr. 22, 2021

(51) Int. Cl.
G06F 9/50 (2006.01)
G06F 21/60 (2013.01)
G06T 1/20 (2006.01)
H04L 9/08 (2006.01)

(52) U.S. Cl.
CPC .......... *G06F 9/5083* (2013.01); *G06F 21/602* (2013.01); *G06T 1/20* (2013.01); *H04L 9/0861* (2013.01)

(58) Field of Classification Search
CPC .................................................. G06F 9/5083
See application file for complete search history.

(56) References Cited

U.S. PATENT DOCUMENTS

| | | | |
|---|---|---|---|
| 10,262,390 B1* | 4/2019 | Sun | G06F 9/5077 |
| 10,423,463 B1* | 9/2019 | Wilt | G06F 9/5027 |
| 2016/0247248 A1* | 8/2016 | Ha | G06F 9/45558 |
| 2016/0371318 A1* | 12/2016 | Hillel | G06F 16/2343 |
| 2018/0089091 A1* | 3/2018 | Akenine-Moller | G06F 12/0875 |
| 2018/0293701 A1 | 10/2018 | Appu et al. | |
| 2018/0300841 A1 | 10/2018 | Schluessler et al. | |
| 2019/0294575 A1* | 9/2019 | Dennison | G06F 9/3877 |
| 2020/0228623 A1* | 7/2020 | Weissman | H04L 67/60 |
| 2020/0228626 A1* | 7/2020 | Bernat | H04L 47/83 |
| 2022/0182467 A1* | 6/2022 | Hutten | H04L 67/131 |

FOREIGN PATENT DOCUMENTS

EP 4020205 A1 6/2022

OTHER PUBLICATIONS

Notification of Publication of Chinese Application No. 202111360731.3, Publication No. CN114675961A mailed Jul. 4, 2022, 50 pages.
Partial European Search Report for European Patent Application No. 21196105.7 mailed Feb. 8, 2022, 12 pages.

* cited by examiner

*Primary Examiner* — Sisley N Kim
(74) *Attorney, Agent, or Firm* — JAFFERY WATSON HAMILTON & DESANCTIS LLP

(57) ABSTRACT

A computing platform is disclosed. The computing platform includes a first computer system comprising a first graphics processing unit (GPU), a network coupled to the first computer system and a second computer system, coupled to the first computer system via the network, comprising a second GPU, wherein the first and second computer system are configured to perform distributed processing of graphics workloads between the first GPU and the second GPU.

18 Claims, 21 Drawing Sheets

Resource Metadata
- Source ID
- Destination ID
- Static/Dynamic
- Page #
- Source Submitted #
- Source Completed #
- Destination Submitted #
- Destination Completed #
- Latency (Submit to first access)
- Latency (Network)
- Latency (Source)

FIG. 11

DYNAMIC RESOURCE MANAGEMENT MECHANISM

BACKGROUND

Disaggregated computing is on the rise in data centers. Cloud service providers (CSP) are deploying solutions where processing of a workload is distributed on disaggregated compute resources, such as CPUs, GPUs, and hardware accelerators (including field programmable gate arrays (FPGAs)), that are connected via a network instead of being on the same platform and connected via physical links such as peripheral component interconnect express (PCIe). Disaggregated computing enables improved resource utilization and lowers ownership costs by enabling more efficient use of available resources.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate typical embodiments and are therefore not to be considered limiting of its scope.

FIG. 11 illustrates one embodiment of resource metadata.

DETAILED DESCRIPTION

Figure 1:
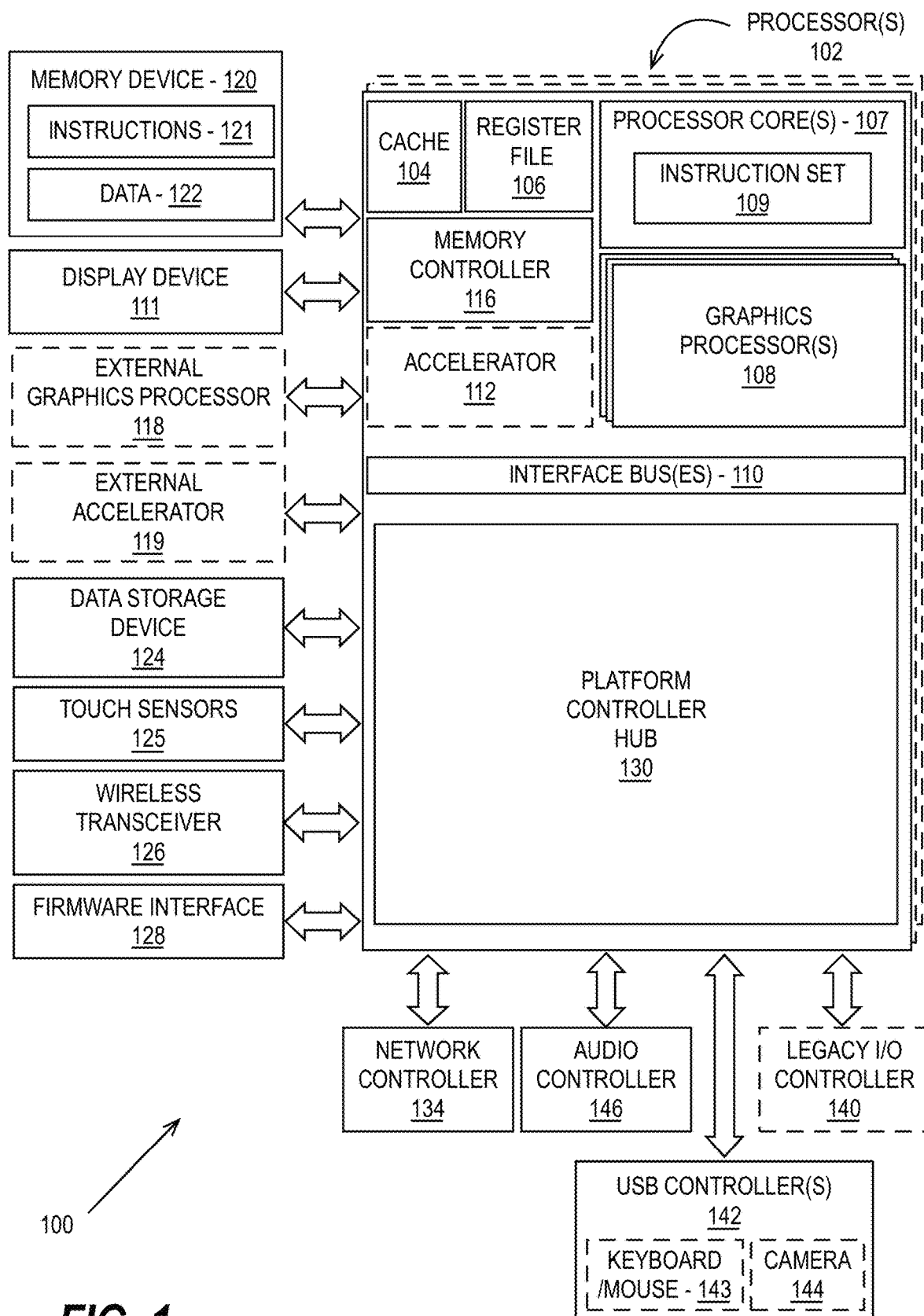
FIG. 1 is a block diagram of a processing system, according to an embodiment.

In the following description, numerous specific details are set forth to provide a more thorough understanding. However, it may be apparent to one of skill in the art that the embodiments described herein may be practiced without one or more of these specific details. In other instances, well-known features have not been described to avoid obscuring the details of the present embodiments.

System Overview

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be utilized. Rather, in some embodiments, such features may be arranged in a different manner and/or order than shown in the illustrative figures. Additionally, the inclusion of a structural or method feature in a particular figure is not meant to imply that such feature is utilized in all embodiments and, in some embodiments, may not be included or may be combined with other features.

Referring now to FIG. 1, a block diagram of a processing system 100, according to an embodiment. System 100 may be used in a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, system 100 can include, couple with, or be integrated within: a server-based gaming platform; a game console, including a game and media console; a mobile gaming console, a handheld game console, or an online game console. In some embodiments the system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In one embodiment, system 100 can include, couple with, or be integrated within a self-driving vehicle such as a bus, tractor trailer, car, motor or electric power cycle, plane or glider (or any combination thereof). The self-driving vehicle may use system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 118, which may communicate with the one or more graphics processors 108 in processors 102 to perform graphics and media operations. In some embodiments, graphics, media, and or compute operations may be assisted by an accelerator 112 which is a coprocessor that can be configured to perform a specialized set of graphics, media, or compute operations. For example, in one embodiment the accelerator 112 is a matrix multiplication accelerator used to optimize machine learning or compute operations. In one embodiment the accelerator 112 is a ray-tracing accelerator that can be used to perform ray-tracing operations in concert with the graphics processor 108. In one embodiment, an external accelerator 119 may be used in place of or in concert with the accelerator 112.

In one embodiment, the accelerator 112 is a field programmable gate array (FPGA). An FPGA refers to an integrated circuit (IC) including an array of programmable logic blocks that can be configured to perform simple logic gates and/or complex combinatorial functions, and may also include memory elements. FPGAs are designed to be configured by a customer or a designer after manufacturing. FPGAs can be used to accelerate parts of an algorithm, sharing part of the computation between the FPGA and a general-purpose processor. In some embodiments, accelerator 112 is a GPU or an application-specific integrated circuit (ASIC). In some implementations, accelerator 112 is also referred to as a compute accelerator or a hardware accelerator.

In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA) or via a peripheral bus, such as a Peripheral Component Interconnect bus (e.g., PCI, PCI express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It may be appreciated that the system 100 shown is one example and not limiting, as other types of data processing systems that are differently configured may also be used. For example, an instance of the memory controller 116 and platform controller hub 130 may be integrated into a discreet external graphics processor, such as the external graphics processor 118. In one embodiment the platform controller hub 130 and/or memory controller 116 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., graphics processing unit (GPUs), graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

Figure 2:
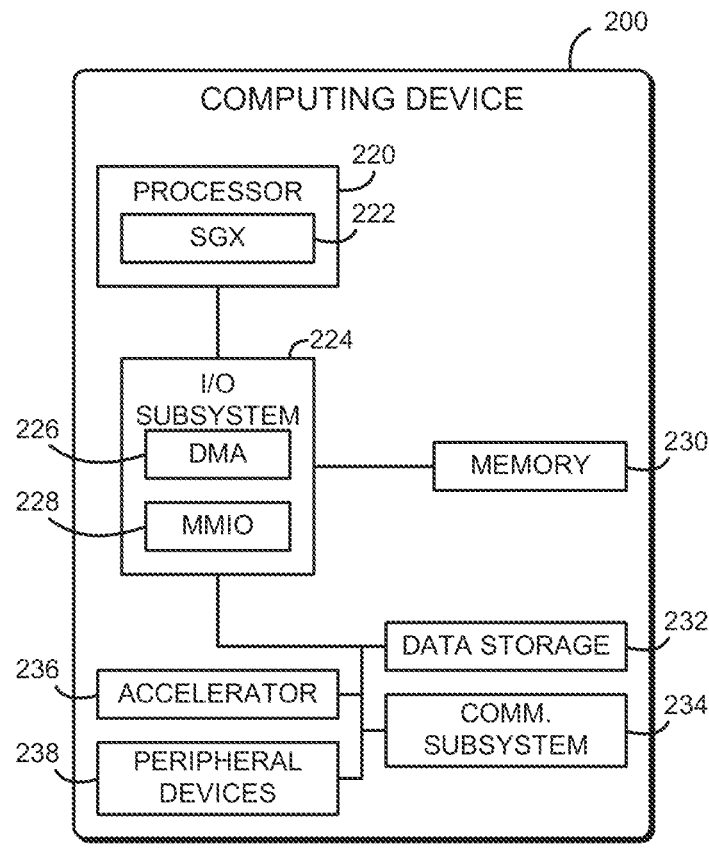
FIG. 2 is a simplified block diagram of at least one embodiment of a computing device for secure I/O with an accelerator device.

FIG. 2 illustrates a block diagrams of an additional processing system architecture provided by embodiments described herein. A computing device 200 for secure I/O with an accelerator device includes a processor 220 and an accelerator device 236, such as a field-programmable gate array (FPGA). In use, as described further below, a trusted execution environment (TEE) established by the processor 220 securely communicates data with the accelerator 236. Data may be transferred using memory-mapped I/O (MMIO) transactions or direct memory access (DMA) transactions. For example, the TEE may perform an MMIO write transaction that includes encrypted data, and the accelerator 236 decrypts the data and performs the write. As another example, the TEE may perform an MMIO read request transaction, and the accelerator 236 may read the requested data, encrypt the data, and perform an MMIO read response transaction that includes the encrypted data. As yet another example, the TEE may configure the accelerator 236 to perform a DMA operation, and the accelerator 236 performs a memory transfer, performs a cryptographic operation (i.e., encryption or decryption), and forwards the result. As described further below, the TEE and the accelerator 236 generate authentication tags (ATs) for the transferred data and may use those ATs to validate the transactions. The computing device 200 may thus keep untrusted software of the computing device 200, such as the operating system or virtual machine monitor, outside of the trusted code base (TCB) of the TEE and the accelerator 236. Thus, the computing device 200 may secure data exchanged or otherwise processed by a TEE and an accelerator 236 from an owner of the computing device 200 (e.g., a cloud service provider) or other tenants of the computing device 200. Accordingly, the computing device 200 may improve security and performance for multi-tenant environments by allowing secure use of accelerator devices.

The computing device 200 may be embodied as any type of device capable of performing the functions described herein. For example, the computing device 200 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 2, the illustrative computing device 200 includes a processor 220, an I/O subsystem 224, a memory 230, and a data storage device 232. Additionally, in some embodiments, one or more of the illustrative components may be incorporated in, or otherwise form a portion of, another component. For example, the memory 230, or portions thereof, may be incorporated in the processor 220 in some embodiments.

The processor 220 may be embodied as any type of processor capable of performing the functions described herein. For example, the processor 220 may be embodied as a single or multi-core processor(s), digital signal processor, microcontroller, or other processor or processing/controlling circuit. As shown, the processor 220 illustratively includes secure enclave support 222, which allows the processor 220 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 220 while being executed or while being stored in certain protected cache memory of the processor 220. The code and data included in the secure enclave may be encrypted when stored in a shared cache or the main memory 230. The secure enclave support 222 may be embodied as a set of processor instruction extensions that allows the processor 220 to establish one or more secure enclaves in the memory 230. For example, the secure enclave support 222 may be embodied as Intel® Software Guard Extensions (SGX) technology.

The memory 230 may be embodied as any type of volatile or non-volatile memory or data storage capable of performing the functions described herein. In operation, the memory 230 may store various data and software used during operation of the computing device 200 such as operating systems, applications, programs, libraries, and drivers. As shown, the memory 230 may be communicatively coupled to the processor 220 via the I/O subsystem 224, which may be embodied as circuitry and/or components to facilitate input/output operations with the processor 220, the memory 230, and other components of the computing device 200. For example, the I/O subsystem 224 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 230 may be directly coupled to the processor 220, for example via an integrated memory controller hub. Additionally, in some embodiments, the I/O subsystem 224 may form a portion of a system-on-a-chip (SoC) and be incorporated, along with the processor 220, the memory 230, the accelerator device 236, and/or other components of the computing device 200, on a single integrated circuit chip. Additionally, or alternatively, in some embodiments the processor 220 may include an integrated memory controller and a system agent, which may be embodied as a logic block in which data traffic from processor cores and I/O devices converges before being sent to the memory 230.

As shown, the I/O subsystem 224 includes a direct memory access (DMA) engine 226 and a memory-mapped I/O (MMIO) engine 228. The processor 220, including secure enclaves established with the secure enclave support 222, may communicate with the accelerator device 236 with one or more DMA transactions using the DMA engine 226 and/or with one or more MMIO transactions using the MMIO engine 228. The computing device 200 may include multiple DMA engines 226 and/or MMIO engines 228 for handling DMA and MMIO read/write transactions based on bandwidth between the processor 220 and the accelerator 236. Although illustrated as being included in the I/O subsystem 224, it should be understood that in some embodiments the DMA engine 226 and/or the MMIO engine 228 may be included in other components of the computing device 200 (e.g., the processor 220, memory controller, or system agent), or in some embodiments may be embodied as separate components.

The data storage device 232 may be embodied as any type of device or devices configured for short-term or long-term storage of data such as, for example, memory devices and circuits, memory cards, hard disk drives, solid-state drives, non-volatile flash memory, or other data storage devices. The computing device 200 may also include a communications subsystem 234, which may be embodied as any communication circuit, device, or collection thereof, capable of enabling communications between the computing device 200 and other remote devices over a computer network (not shown). The communications subsystem 234 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The accelerator device 236 may be embodied as a field-programmable gate array (FPGA), an application-specific integrated circuit (ASIC), a coprocessor, or other digital logic device capable of performing accelerated functions (e.g., accelerated application functions, accelerated network functions, or other accelerated functions). Illustratively, the accelerator device 236 is an FPGA, which may be embodied as an integrated circuit including programmable digital logic resources that may be configured after manufacture. The FPGA may include, for example, a configurable array of logic blocks in communication over a configurable data interchange. The accelerator device 236 may be coupled to the processor 220 via a high-speed connection interface such as a peripheral bus (e.g., a PCI Express bus) or an inter-processor interconnect (e.g., an in-die interconnect (IDI) or QuickPath Interconnect (QPI)), or via any other appropriate interconnect. The accelerator device 236 may receive data and/or commands for processing from the processor 220 and return results data to the processor 220 via DMA, MMIO, or other data transfer transactions.

As shown, the computing device 200 may further include one or more peripheral devices 238. The peripheral devices 238 may include any number of additional input/output devices, interface devices, hardware accelerators, and/or other peripheral devices. For example, in some embodiments, the peripheral devices 238 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Field Programmable Gate Arrays (FPGAs)

Figure 3:
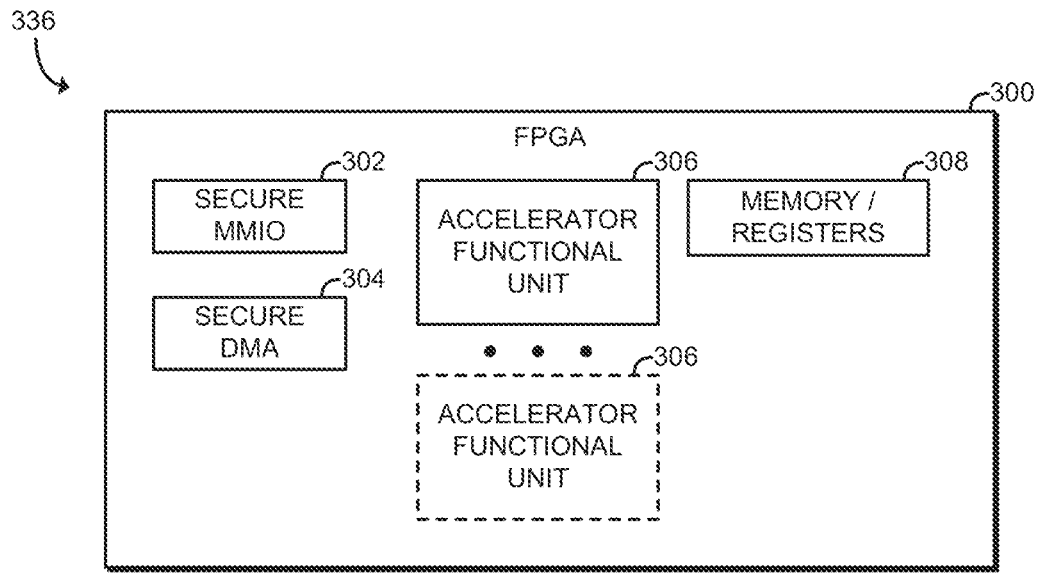
FIG. 3 is a simplified block diagram of at least one embodiment of an accelerator device of the computing device of FIG. 2.

Referring now to FIG. 3, an illustrative embodiment of a field-programmable gate array (FPGA) 300 is shown. As shown, the FPGA 300 is one potential embodiment of an accelerator device 236 described with respect to FIG. 2. The illustratively FPGA 300 includes a secure MMIO engine 302, a secure DMA engine 304, one or more accelerator functional units (AFUs) 306, and memory/registers 308. As described further below, the secure MMIO engine 302 and the secure DMA engine 304 perform in-line authenticated cryptographic operations on data transferred between the processor 220 (e.g., a secure enclave established by the processor) and the FPGA 300 (e.g., one or more AFUs 306). In some embodiments, the secure MMIO engine 302 and/or the secure DMA engine 304 may intercept, filter, or otherwise process data traffic on one or more cache-coherent interconnects, internal buses, or other interconnects of the FPGA 300.

Each AFU 306 may be embodied as logic resources of the FPGA 300 that are configured to perform an acceleration task. Each AFU 306 may be associated with an application executed by the computing device 100 in a secure enclave or other trusted execution environment. Each AFU 306 may be configured or otherwise supplied by a tenant or other user of the computing device 100. For example, each AFU 306 may correspond to a bitstream image programmed to the FPGA 300. As described further below, data processed by each AFU 306, including data exchanged with the trusted execution environment, may be cryptographically protected from untrusted components of the computing device 100 (e.g., protected from software outside of the trusted code base of the tenant enclave). Each AFU 306 may access or otherwise process stored in the memory/registers 308, which may be embodied as internal registers, cache, SRAM, storage, or other memory of the FPGA 300. In some embodiments, the memory 308 may also include external DRAM or other dedicated memory coupled to the FPGA 300.

Computing Systems and Graphics Processors

FIGS. 4A-4D illustrate computing systems and graphics processors provided by embodiments described herein. The elements of FIGS. 4A-4D having the same reference numbers (or names) as the elements of any other figure herein can operate or function in any manner similar to that described elsewhere herein, but are not limited to such.

In some implementations, a GPU is communicatively coupled to host/processor cores to accelerate, for example, graphics operations, machine-learning operations, pattern analysis operations, and/or various general-purpose GPU (GPGPU) functions. The GPU may be communicatively coupled to the host processor/cores over a bus or another interconnect (e.g., a high-speed interconnect such as PCIe or NVLink). Alternatively, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Figure 4A:
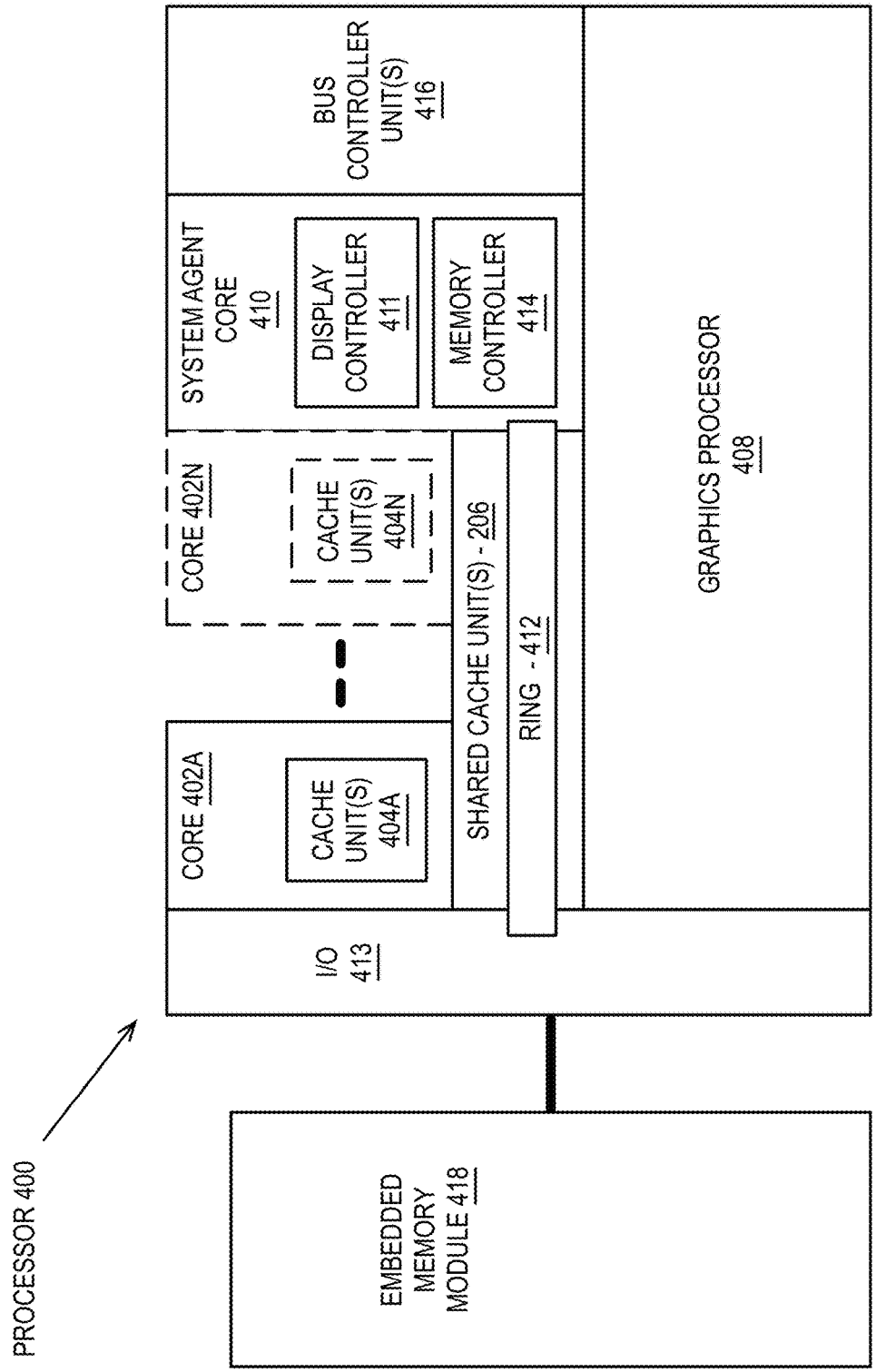
FIGS. 4A-4D illustrate computing systems and graphics processors provided by embodiments described herein.

FIG. 4A is a block diagram of an embodiment of a processor 400 having one or more processor cores 402A-402N, an integrated memory controller 414, and an integrated graphics processor 408. Processor 400 can include additional cores up to and including additional core 402N represented by the dashed lined boxes. Each of processor cores 402A-402N includes one or more internal cache units 404A-404N. In some embodiments each processor core also has access to one or more shared cached units 406. The internal cache units 404A-404N and shared cache units 406 represent a cache memory hierarchy within the processor 400. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 406 and 404A-404N.

In some embodiments, processor 400 may also include a set of one or more bus controller units 416 and a system agent core 410. The one or more bus controller units 416 manage a set of peripheral buses, such as one or more PCI or PCI express busses. System agent core 410 provides management functionality for the various processor components. In some embodiments, system agent core 410 includes one or more integrated memory controllers 414 to manage access to various external memory devices (not shown).

In some embodiments, one or more of the processor cores 402A-402N include support for simultaneous multi-threading. In such embodiment, the system agent core 410 includes components for coordinating and operating cores 402A-402N during multi-threaded processing. System agent core 410 may additionally include a power control unit (PCU), which includes logic and components to regulate the power state of processor cores 402A-402N and graphics processor 408.

In some embodiments, processor 400 additionally includes graphics processor 408 to execute graphics processing operations. In some embodiments, the graphics processor 408 couples with the set of shared cache units 406, and the system agent core 410, including the one or more integrated memory controllers 414. In some embodiments, the system agent core 410 also includes a display controller 411 to drive graphics processor output to one or more coupled displays. In some embodiments, display controller 411 may also be a separate module coupled with the graphics processor via at least one interconnect, or may be integrated within the graphics processor 408.

In some embodiments, a ring-based interconnect unit 412 is used to couple the internal components of the processor 400. However, an alternative interconnect unit may be used, such as a point-to-point interconnect, a switched interconnect, or other techniques, including techniques well known in the art. In some embodiments, graphics processor 408 couples with the ring interconnect 412 via an I/O link 413.

The example I/O link 413 represents at least one of multiple varieties of I/O interconnects, including an on package I/O interconnect which facilitates communication between various processor components and a high-performance embedded memory module 418, such as an eDRAM module. In some embodiments, each of the processor cores 402A-402N and graphics processor 408 can use embedded memory modules 418 as a shared Last Level Cache.

In some embodiments, processor cores 402A-402N are homogenous cores executing the same instruction set architecture. In another embodiment, processor cores 402A-402N are heterogeneous in terms of instruction set architecture (ISA), where one or more of processor cores 402A-402N execute a first instruction set, while at least one of the other cores executes a subset of the first instruction set or a different instruction set. In one embodiment, processor cores 402A-402N are heterogeneous in terms of microarchitecture, where one or more cores having a relatively higher power consumption couple with one or more power cores having a lower power consumption. In one embodiment, processor cores 402A-402N are heterogeneous in terms of computational capability. Additionally, processor 400 can be implemented on one or more chips or as an SoC integrated circuit having the illustrated components, in addition to other components.

Figure 4B:
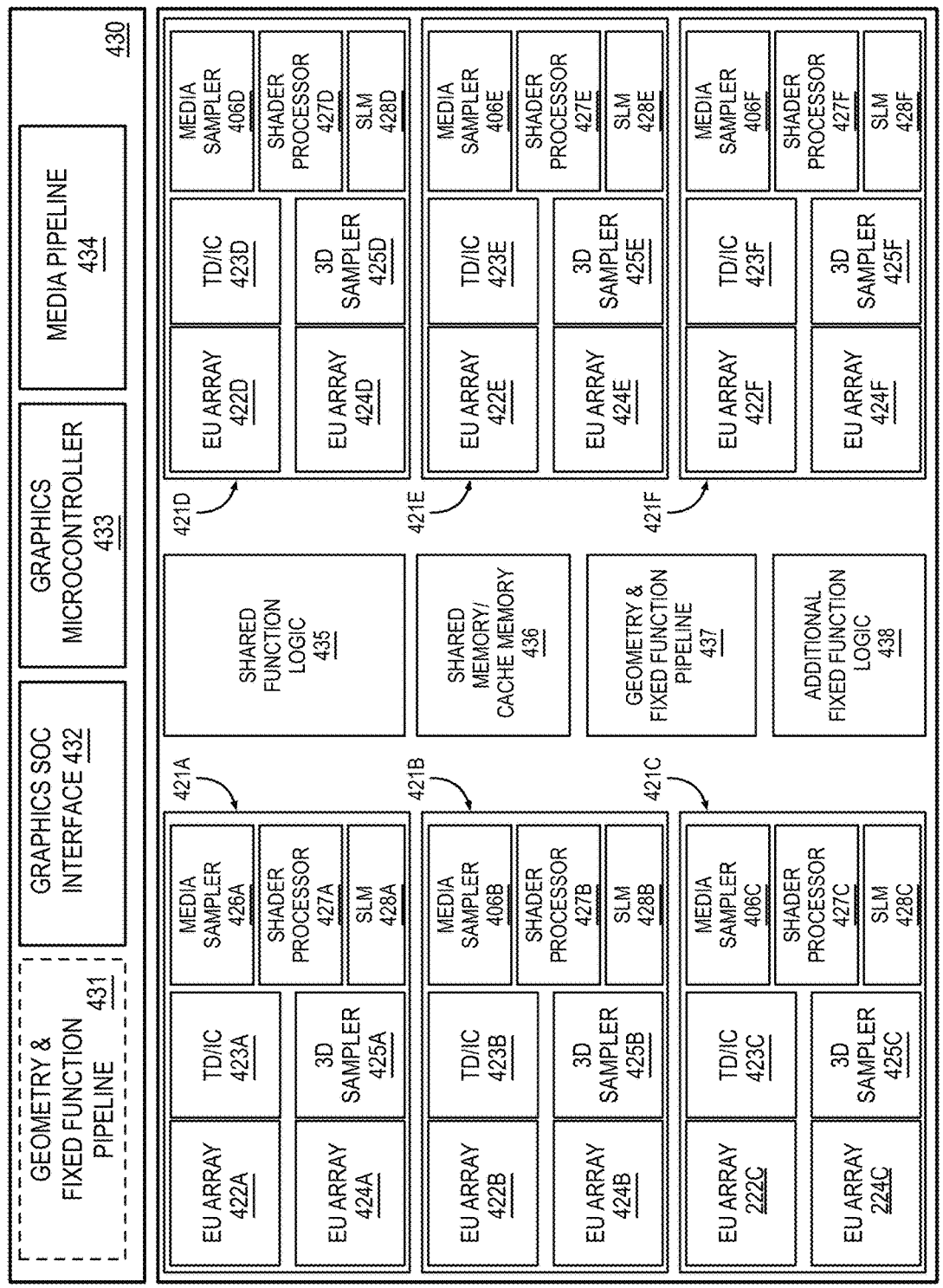

FIG. 4B is a block diagram of hardware logic of a graphics processor core 419, according to some embodiments described herein. Elements of FIG. 4B having the same reference numbers (or names) as the elements of any other figure herein can operate or function in any manner similar to that described elsewhere herein, but are not limited to such. The graphics processor core 419, sometimes referred to as a core slice, can be one or multiple graphics cores within a modular graphics processor. The graphics processor core 419 is an example of one graphics core slice, and a graphics processor as described herein may include multiple graphics core slices based on target power and performance envelopes. Each graphics processor core 419 can include a fixed function block 430 coupled with multiple sub-cores 421A-421F, also referred to as sub-slices, that include modular blocks of general-purpose and fixed function logic.

In some embodiments, the fixed function block 430 includes a geometry/fixed function pipeline 431 that can be shared by all sub-cores in the graphics processor core 419, for example, in lower performance and/or lower power graphics processor implementations. In various embodiments, the geometry/fixed function pipeline 431 includes a 3D fixed function, a video front-end unit, a thread spawner and thread dispatcher, and a unified return buffer manager, which manages unified return buffers.

In one embodiment the fixed function block 430 also includes a graphics SoC interface 432, a graphics microcontroller 433, and a media pipeline 434. The graphics SoC interface 432 provides an interface between the graphics processor core 419 and other processor cores within a system on a chip integrated circuit. The graphics microcontroller 433 is a programmable sub-processor that is configurable to manage various functions of the graphics processor core 419, including thread dispatch, scheduling, and pre-emption. The media pipeline 434 includes logic to facilitate the decoding, encoding, pre-processing, and/or post-processing of multimedia data, including image and video data. The media pipeline 434 implement media operations via requests to compute or sampling logic within the sub-cores 421-421F.

In one embodiment the SoC interface 432 enables the graphics processor core 419 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 432 can also enable communication with fixed function devices within the SoC, such as camera imaging pipelines, and enables the use of and/or implements global memory atomics that may be shared between the graphics processor core 419 and CPUs within the SoC. The SoC interface 432 can also implement power management controls for the graphics processor core 419 and enable an interface between a clock domain of the graphic core 419 and other clock domains within the SoC. In one embodiment the SoC interface 432 enables receipt of command buffers from a command streamer and global thread dispatcher that are configured to provide commands and instructions to each of one or more graphics cores within a graphics processor. The commands and instructions can be dispatched to the media pipeline 434, when media operations are to be performed, or a geometry and fixed function pipeline (e.g., geometry and fixed function pipeline 431, geometry and fixed function pipeline 437) when graphics processing operations are to be performed.

The graphics microcontroller 433 can be configured to perform various scheduling and management tasks for the graphics processor core 419. In one embodiment the graphics microcontroller 433 can perform graphics and/or compute workload scheduling on the various graphics parallel engines within execution unit (EU) arrays 422A-422F, 424A-424F within the sub-cores 421A-421F. In this scheduling model, host software executing on a CPU core of an SoC including the graphics processor core 419 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 433 can also facilitate low-power or idle states for the graphics processor core 419, providing the graphics processor core 419 with the ability to save and restore registers within the graphics processor core 419 across low-power state transitions independently from the operating system and/or graphics driver software on the system.

The graphics processor core 419 may have greater than or fewer than the illustrated sub-cores 421A-421F, up to N modular sub-cores. For each set of N sub-cores, the graphics processor core 419 can also include shared function logic 435, shared and/or cache memory 436, a geometry/fixed function pipeline 437, as well as additional fixed function logic 438 to accelerate various graphics and compute processing operations. The shared function logic 435 can include logic units associated with the shared function logic (e.g., sampler, math, and/or inter-thread communication logic) that can be shared by each N sub-cores within the graphics processor core 419. The shared and/or cache memory 436 can be a last-level cache for the set of N sub-cores 421A-421F within the graphics processor core 419, and can also serve as shared memory that is accessible by multiple sub-cores. The geometry/fixed function pipeline 437 can be included instead of the geometry/fixed function pipeline 431 within the fixed function block 430 and can include the same or similar logic units.

In one embodiment the graphics processor core 419 includes additional fixed function logic 438 that can include various fixed function acceleration logic for use by the graphics processor core 419. In one embodiment the additional fixed function logic 438 includes an additional geometry pipeline for use in position only shading. In position-only shading, two geometry pipelines exist, the full geometry pipeline within the geometry/fixed function pipeline 438, 431, and a cull pipeline, which is an additional geometry pipeline which may be included within the additional fixed function logic 438. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example, and in one embodiment, the cull pipeline logic within the additional fixed function logic 438 can execute position shaders in parallel with the main application and generally generates results faster than the full pipeline, as the cull pipeline fetches and shades the position attribute of the vertices, without performing rasterization and rendering of the pixels to the frame buffer. The cull pipeline can use the generated results to compute visibility information for all the triangles without regard to whether those triangles are culled. The full pipeline (which in this instance may be referred to as a replay pipeline) can consume the visibility information to skip the culled triangles to shade the visible triangles that are finally passed to the rasterization phase.

In one embodiment the additional fixed function logic 438 can also include machine-learning acceleration logic, such as fixed function matrix multiplication logic, for implementations including optimizations for machine learning training or inferencing.

Within each graphics sub-core 421A-421F includes a set of execution resources that may be used to perform graphics, media, and compute operations in response to requests by graphics pipeline, media pipeline, or shader programs. The graphics sub-cores 421A-421F include multiple EU arrays 422A-422F, 424A-424F, thread dispatch and inter-thread communication (TD/IC) logic 423A-423F, a 3D (e.g., texture) sampler 425A-425F, a media sampler 406A-406F, a shader processor 427A-427F, and shared local memory (SLM) 428A-428F. The EU arrays 422A-422F, 424A-424F each include multiple execution units, which are general-purpose graphics processing units capable of performing floating-point and integer/fixed-point logic operations in service of a graphics, media, or compute operation, including graphics, media, or compute shader programs. The TD/IC logic 423A-423F performs local thread dispatch and thread control operations for the execution units within a sub-core and facilitate communication between threads executing on the execution units of the sub-core. The 3D sampler 425A-425F can read texture or other 3D graphics related data into memory. The 3D sampler can read texture data differently based on a configured sample state and the texture format associated with a given texture. The media sampler 406A-406F can perform similar read operations based on the type and format associated with media data. In one embodiment, each graphics sub-core 421A-421F can alternately include a unified 3D and media sampler. Threads executing on the execution units within each of the sub-cores 421A-421F can make use of shared local memory 428A-428F within each sub-core, to enable threads executing within a thread group to execute using a common pool of on-chip memory.

Figure 4C:
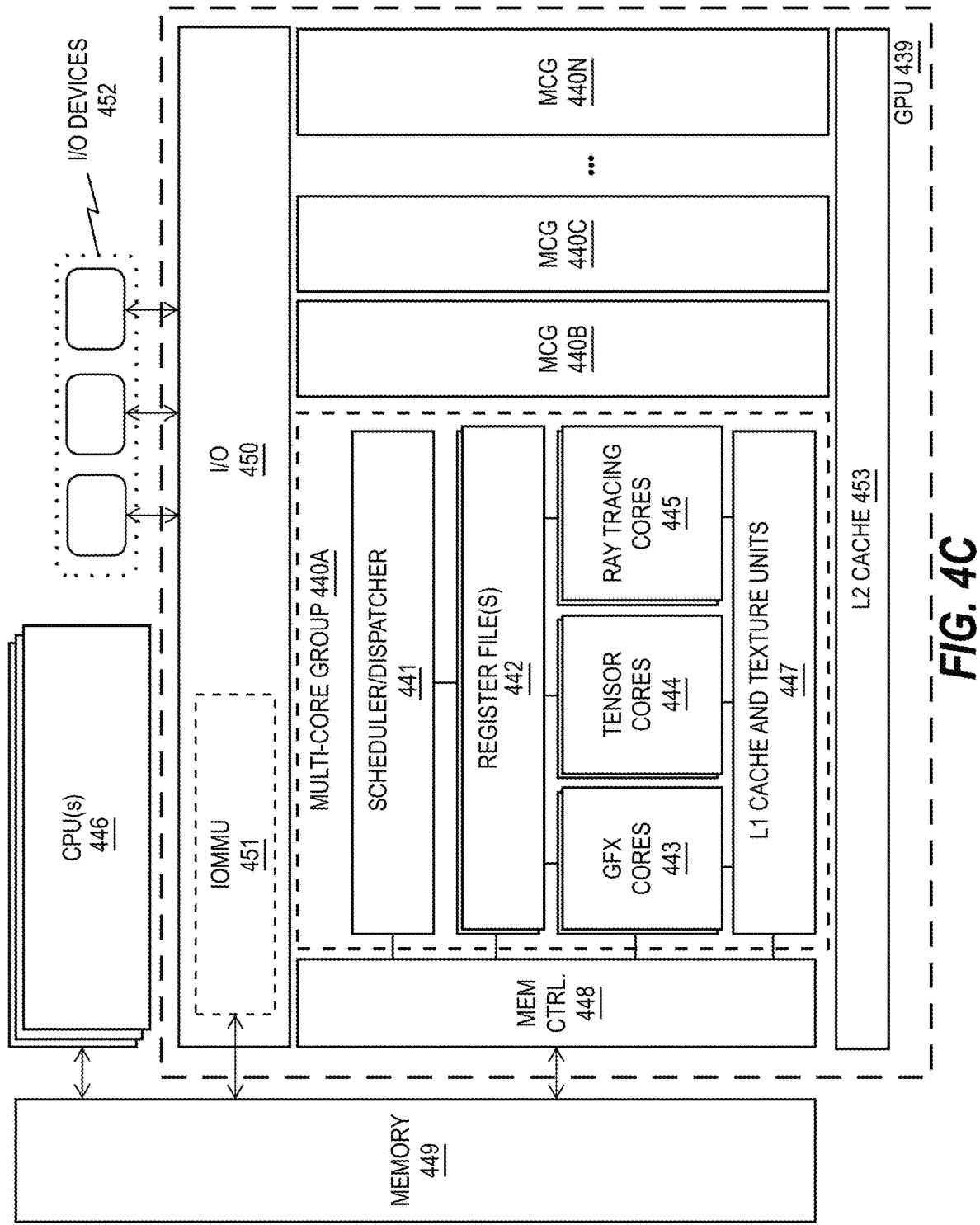

FIG. 4C illustrates a graphics processing unit (GPU) 439 that includes dedicated sets of graphics processing resources arranged into multi-core groups 440A-440N. While the details of a single multi-core group 440A are provided, it may be appreciated that the other multi-core groups 440B-440N may be equipped with the same or similar sets of graphics processing resources.

As illustrated, a multi-core group 440A may include a set of graphics cores 443, a set of tensor cores 444, and a set of ray tracing cores 445. A scheduler/dispatcher 441 schedules and dispatches the graphics threads for execution on the various cores 443, 444, 445. A set of register files 442 store operand values used by the cores 443, 444, 445 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more combined level 1 (L1) caches and shared memory units 447 store graphics data such as texture data, vertex data, pixel data, ray data, bounding volume data, etc., locally within each multi-core group 440A. One or more texture units 447 can also be used to perform texturing operations, such as texture mapping and sampling. A Level 2 (L2) cache 453 shared by all or a subset of the multi-core groups 440A-440N stores graphics data and/or instructions for multiple concurrent graphics threads. As illustrated, the L2 cache 453 may be shared across a plurality of multi-core groups 440A-440N. One or more memory controllers 448 couple the GPU 439 to a memory 449 which may be a system memory (e.g., DRAM) and/or a dedicated graphics memory (e.g., GDDR6 memory).

Input/output (I/O) circuitry 450 couples the GPU 439 to one or more I/O devices 452 such as digital signal processors (DSPs), network controllers, or user input devices. An on-chip interconnect may be used to couple the I/O devices 452 to the GPU 439 and memory 449. One or more I/O memory management units (IOMMUs) 451 of the I/O circuitry 450 couple the I/O devices 452 directly to the system memory 449. In one embodiment, the IOMMU 451 manages multiple sets of page tables to map virtual addresses to physical addresses in system memory 449. In this embodiment, the I/O devices 452, CPU(s) 446, and GPU(s) 439 may share the same virtual address space.

In one implementation, the IOMMU 451 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 449). The base addresses of each of the first and second sets of page tables may be stored in control registers and swapped out on a context switch (e.g., so that the new context is provided with access to the relevant set of page tables). While not illustrated in FIG. 4C, each of the cores 443, 444, 445 and/or multi-core groups 440A-440N may include translation lookaside buffers (TLBs) to cache guest virtual to guest physical translations, guest physical to host physical translations, and guest virtual to host physical translations.

In one embodiment, the CPUs 446, GPUs 439, and I/O devices 452 are integrated on a single semiconductor chip and/or chip package. The illustrated memory 449 may be integrated on the same chip or may be coupled to the memory controllers 448 via an off-chip interface. In one implementation, the memory 449 comprises GDDR6 memory which shares the same virtual address space as other physical system-level memories, although the underlying principles of implementations of the disclosure are not limited to this specific implementation.

In one embodiment, the tensor cores 444 include a plurality of execution units specifically designed to perform matrix operations, which are the compute operations used to perform deep learning operations. For example, simultaneous matrix multiplication operations may be used for neural network training and inferencing. The tensor cores 444 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 444. The training of neural networks, in particular, utilizes a significant number matrix dot product operations. In order to process an inner-product formulation of an N×N×N matrix multiply, the tensor cores 444 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 444 to ensure that the most efficient precision is used for different workloads (e.g., such as inferencing workloads which can tolerate quantization to bytes and half-bytes).

In one embodiment, the ray tracing cores 445 accelerate ray tracing operations for both real-time ray tracing and non-real-time ray tracing implementations. In particular, the ray tracing cores 445 include ray traversal/intersection circuitry for performing ray traversal using bounding volume hierarchies (BVHs) and identifying intersections between rays and primitives enclosed within the BVH volumes. The ray tracing cores 445 may also include circuitry for performing depth testing and culling (e.g., using a Z buffer or similar arrangement). In one implementation, the ray tracing cores 445 perform traversal and intersection operations in concert with the image denoising techniques described herein, at least a portion of which may be executed on the tensor cores 444. For example, in one embodiment, the tensor cores 444 implement a deep learning neural network to perform denoising of frames generated by the ray tracing cores 445. However, the CPU(s) 446, graphics cores 443, and/or ray tracing cores 445 may also implement all or a portion of the denoising and/or deep learning algorithms.

In addition, as described above, a distributed approach to denoising may be employed in which the GPU 439 is in a computing device coupled to other computing devices over a network or high speed interconnect. In this embodiment, the interconnected computing devices share neural network learning/training data to improve the speed with which the overall system learns to perform denoising for different types of image frames and/or different graphics applications.

In one embodiment, the ray tracing cores 445 process all BVH traversal and ray-primitive intersections, saving the graphics cores 443 from being overloaded with thousands of instructions per ray. In one embodiment, each ray tracing core 445 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 440A can simply launch a ray probe, and the ray tracing cores 445 independently perform ray traversal and intersection and return hit data (e.g., a hit, no hit, multiple hits, etc.) to the thread context. The other cores 443, 444 are freed to perform other graphics or compute work while the ray tracing cores 445 perform the traversal and intersection operations.

In one embodiment, each ray tracing core 445 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 443 and tensor cores 444) are freed to perform other forms of graphics work.

In one particular embodiment described below, a hybrid rasterization/ray tracing approach is used in which work is distributed between the graphics cores 443 and ray tracing cores 445.

In one embodiment, the ray tracing cores 445 (and/or other cores 443, 444) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 445, graphics cores 443 and tensor cores 444 is Vulkan 1.1.85. Note, however, that the underlying principles of implementations of the disclosure are not limited to any particular ray tracing ISA.

In general, the various cores 445, 444, 443 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray can traverse.

Exceptions—Includes various types of exception handlers (e.g., invoked for various error conditions).

Figure 4D:
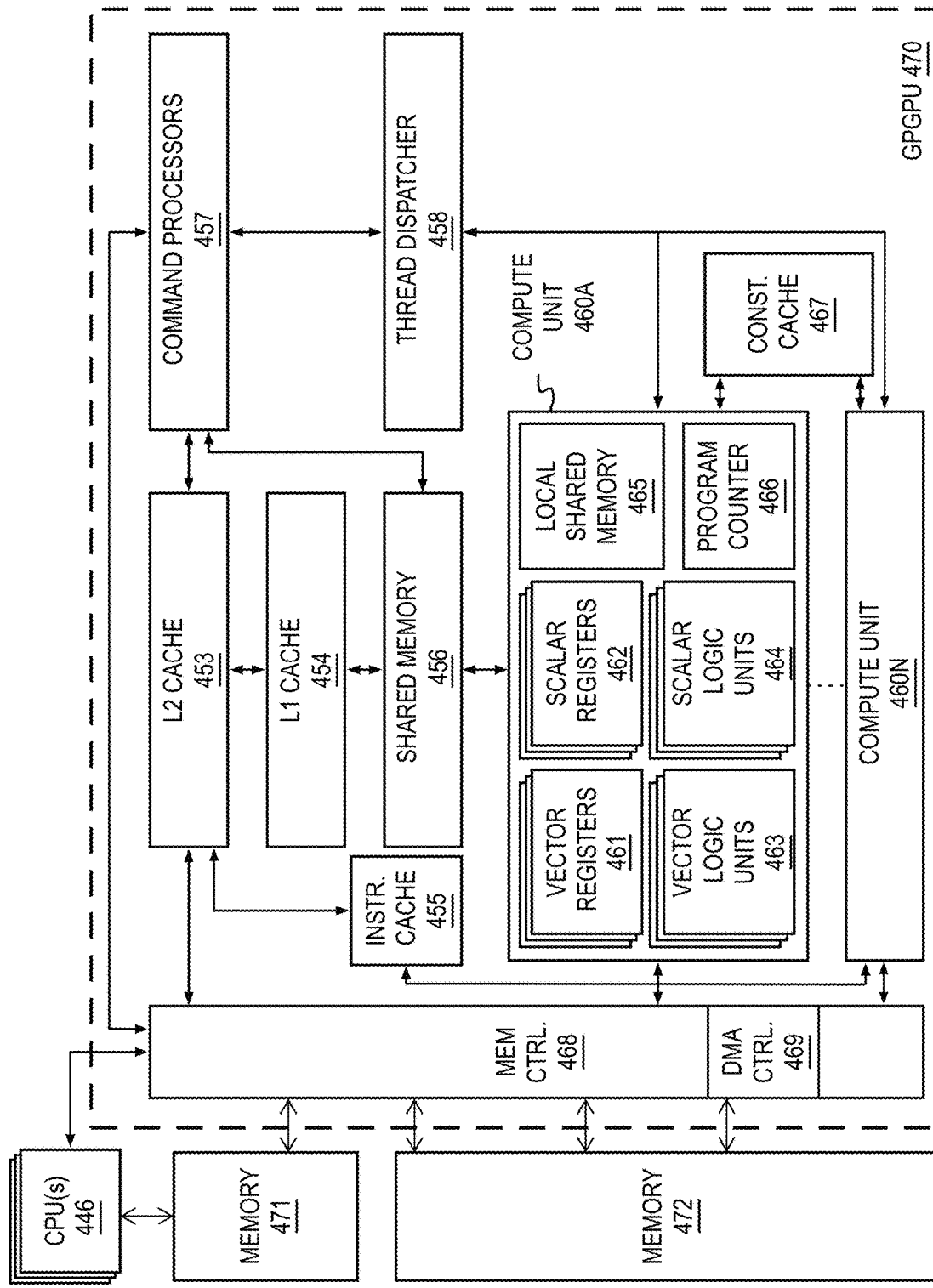

FIG. 4D is a block diagram of general purpose graphics processing unit (GPGPU) 470 that can be configured as a graphics processor and/or compute accelerator, according to embodiments described herein. The GPGPU 470 can interconnect with host processors (e.g., one or more CPU(s) 446) and memory 471, 472 via one or more system and/or memory busses. In one embodiment the memory 471 is system memory that may be shared with the one or more CPU(s) 446, while memory 472 is device memory that is dedicated to the GPGPU 470. In one embodiment, components within the GPGPU 470 and device memory 472 may be mapped into memory addresses that are accessible to the one or more CPU(s) 446. Access to memory 471 and 472 may be facilitated via a memory controller 468. In one embodiment the memory controller 468 includes an internal direct memory access (DMA) controller 469 or can include logic to perform operations that would otherwise be performed by a DMA controller.

The GPGPU 470 includes multiple cache memories, including an L2 cache 453, L1 cache 454, an instruction cache 455, and shared memory 456, at least a portion of which may also be partitioned as a cache memory. The GPGPU 470 also includes multiple compute units 460A-460N. Each compute unit 460A-460N includes a set of vector registers 461, scalar registers 462, vector logic units 463, and scalar logic units 464. The compute units 460A-460N can also include local shared memory 465 and a program counter 466. The compute units 460A-460N can couple with a constant cache 467, which can be used to store constant data, which is data that may not change during the run of kernel or shader program that executes on the GPGPU 470. In one embodiment the constant cache 467 is a scalar data cache and cached data can be fetched directly into the scalar registers 462.

During operation, the one or more CPU(s) 446 can write commands into registers or memory in the GPGPU 470 that has been mapped into an accessible address space. The command processors 457 can read the commands from registers or memory and determine how those commands can be processed within the GPGPU 470. A thread dispatcher 458 can then be used to dispatch threads to the compute units 460A-460N to perform those commands. Each compute unit 460A-460N can execute threads independently of the other compute units. Additionally, each compute unit 460A-460N can be independently configured for conditional computation and can conditionally output the results of computation to memory. The command processors 457 can interrupt the one or more CPU(s) 446 when the submitted commands are complete.

Graphics Software Architecture

Figure 5:
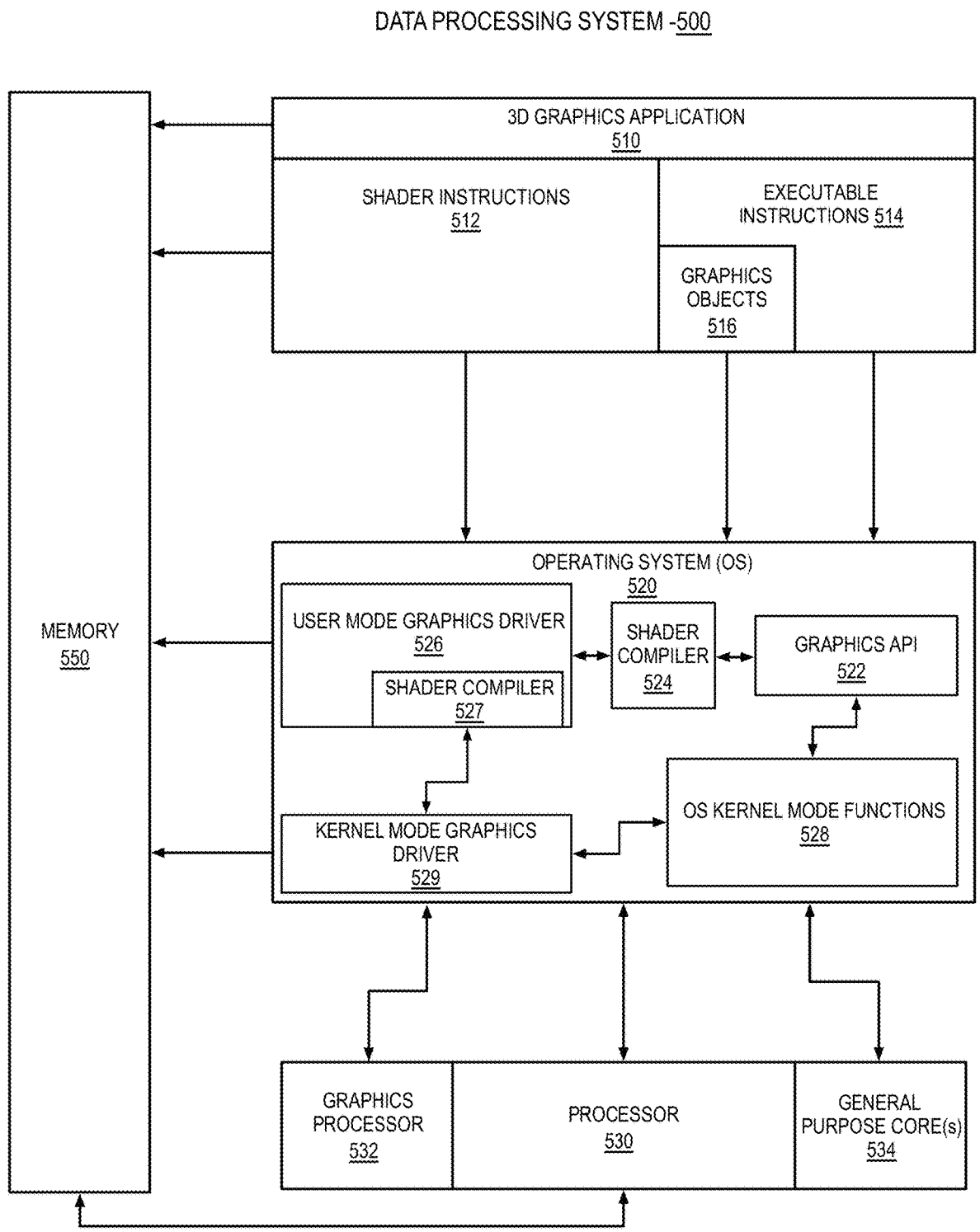
FIG. 5 illustrates example graphics software architecture for a data processing system in accordance with some embodiments.

FIG. 5 illustrates an example graphics software architecture for a data processing system 500 according to some embodiments. In some embodiments, software architecture includes a 3D graphics application 510, an operating system 520, and at least one processor 530. In some embodiments, processor 530 includes a graphics processor 532 and one or more general-purpose processor core(s) 534. The graphics application 510 and operating system 520 each execute in the system memory 550 of the data processing system.

In some embodiments, 3D graphics application 510 contains one or more shader programs including shader instructions 512. The shader language instructions may be in a high-level shader language, such as the High-Level Shader Language (HLSL) of Direct3D, the OpenGL Shader Language (GLSL), and so forth. The application also includes executable instructions 514 in a machine language suitable for execution by the general-purpose processor core 534. The application also includes graphics objects 516 defined by vertex data.

In some embodiments, operating system 520 is a Microsoft® Windows® operating system from the Microsoft Corporation, a proprietary UNIX-like operating system, or an open source UNIX-like operating system using a variant of the Linux kernel. The operating system 520 can support a graphics API 522 such as the Direct3D API, the OpenGL API, or the Vulkan API. When the Direct3D API is in use, the operating system 520 uses a front-end shader compiler 524 to compile any shader instructions 512 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 510. In some embodiments, the shader instructions 512 are provided in an intermediate form, such as a version of the Standard Portable Intermediate Representation (SPIR) used by the Vulkan API.

In some embodiments, user mode graphics driver 526 contains a back-end shader compiler 527 to convert the shader instructions 512 into a hardware specific representation. When the OpenGL API is in use, shader instructions 512 in the GLSL high-level language are passed to a user mode graphics driver 526 for compilation. In some embodiments, user mode graphics driver 526 uses operating system kernel mode functions 528 to communicate with a kernel mode graphics driver 529. In some embodiments, kernel mode graphics driver 529 communicates with graphics processor 532 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 6A:
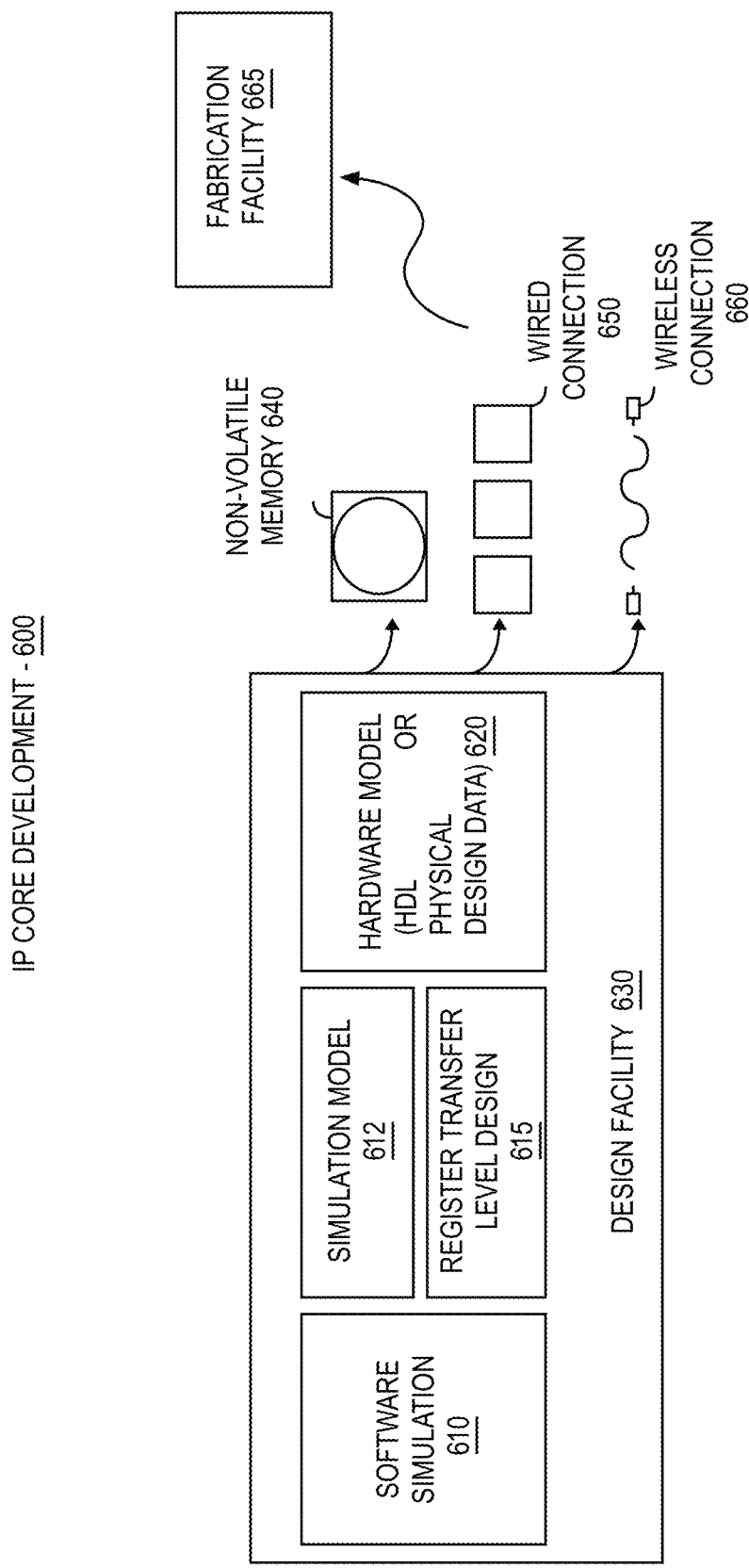
FIG. 6A is a block diagram illustrating an IP core development system in accordance with some embodiments.

FIG. 6A is a block diagram illustrating an IP core development system 600 that may be used to manufacture an integrated circuit to perform operations according to an embodiment. The IP core development system 600 may be used to generate modular, re-usable designs that can be incorporated into a larger design or used to construct an entire integrated circuit (e.g., an SOC integrated circuit). A design facility 630 can generate a software simulation 610 of an IP core design in a high-level programming language (e.g., C/C++). The software simulation 610 can be used to design, test, and verify the behavior of the IP core using a simulation model 612. The simulation model 612 may include functional, behavioral, and/or timing simulations. A register transfer level (RTL) design 615 can then be created or synthesized from the simulation model 612. The RTL design 615 is an abstraction of the behavior of the integrated circuit that models the flow of digital signals between hardware registers, including the associated logic performed using the modeled digital signals. In addition to an RTL design 615, lower-level designs at the logic level or transistor level may also be created, designed, or synthesized. Thus, the particular details of the initial design and simulation may vary.

The RTL design 615 or equivalent may be further synthesized by the design facility into a hardware model 620, which may be in a hardware description language (HDL), or some other representation of physical design data. The HDL may be further simulated or tested to verify the IP core design. The IP core design can be stored for delivery to a $3^{rd}$ party fabrication facility 665 using non-volatile memory 640 (e.g., hard disk, flash memory, or any non-volatile storage medium). Alternatively, the IP core design may be transmitted (e.g., via the Internet) over a wired connection 650 or wireless connection 660. The fabrication facility 665 may then fabricate an integrated circuit that is based at least in part on the IP core design. The fabricated integrated circuit can be configured to perform operations in accordance with at least one embodiment described herein.

Figure 6B:
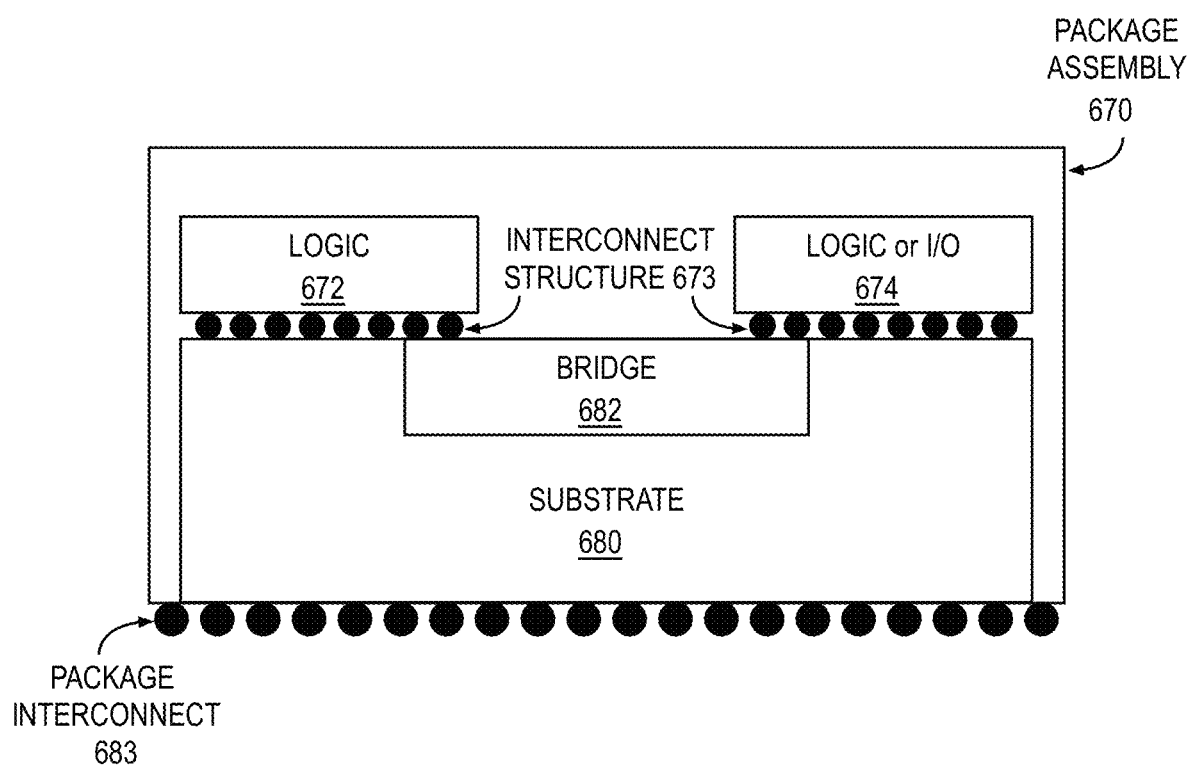
FIG. 6B illustrates a cross-section side view of an integrated circuit package assembly in accordance with some embodiments.

FIG. 6B illustrates a cross-section side view of an integrated circuit package assembly 670, according to some embodiments described herein. The integrated circuit package assembly 670 illustrates an implementation of one or more processor or accelerator devices as described herein. The package assembly 670 includes multiple units of hardware logic 672, 674 connected to a substrate 680. The logic 672, 674 may be implemented at least partly in configurable logic or fixed-functionality logic hardware, and can include one or more portions of any of the processor core(s), graphics processor(s), or other accelerator devices described herein. Each unit of logic 672, 674 can be implemented within a semiconductor die and coupled with the substrate 680 via an interconnect structure 673. The interconnect structure 673 may be configured to route electrical signals between the logic 672, 674 and the substrate 680, and can include interconnects such as, but not limited to bumps or pillars. In some embodiments, the interconnect structure 673 may be configured to route electrical signals such as, for example, input/output (I/O) signals and/or power or ground signals associated with the operation of the logic 672, 674. In some embodiments, the substrate 680 is an epoxy-based laminate substrate. The substrate 680 may include other suitable types of substrates in other embodiments. The package assembly 670 can be connected to other electrical devices via a package interconnect 683. The package interconnect 683 may be coupled to a surface of the substrate 680 to route electrical signals to other electrical devices, such as a motherboard, other chipset, or multi-chip module.

In some embodiments, the units of logic 672, 674 are electrically coupled with a bridge 682 that is configured to route electrical signals between the logic 672, 674. The bridge 682 may be a dense interconnect structure that provides a route for electrical signals. The bridge 682 may include a bridge substrate composed of glass or a suitable semiconductor material. Electrical routing features can be formed on the bridge substrate to provide a chip-to-chip connection between the logic 672, 674.

Although two units of logic 672, 674 and a bridge 682 are illustrated, embodiments described herein may include more or fewer logic units on one or more dies. The one or more dies may be connected by zero or more bridges, as the bridge 682 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Figure 6C:
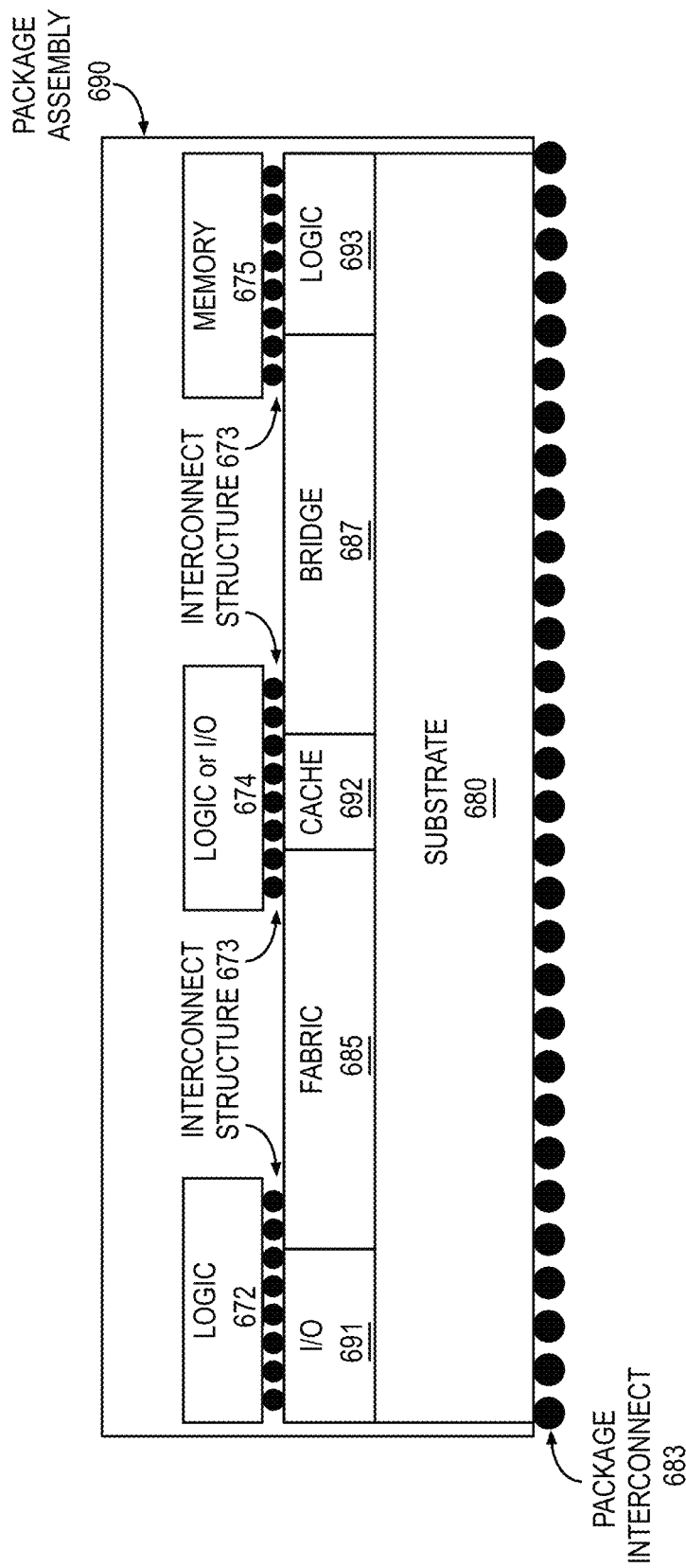
FIG. 6C illustrates a package assembly that includes multiple units of hardware logic chiplets connected to a substrate (e.g., base die) in accordance with some embodiments.

FIG. 6C illustrates a package assembly 690 that includes multiple units of hardware logic chiplets connected to a substrate 680 (e.g., base die). A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. Additionally, the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

The hardware logic chiplets can include special purpose hardware logic chiplets 672, logic or I/O chiplets 674, and/or memory chiplets 675. The hardware logic chiplets 672 and logic or I/O chiplets 674 may be implemented at least partly in configurable logic or fixed-functionality logic hardware and can include one or more portions of any of the processor core(s), graphics processor(s), parallel processors, or other accelerator devices described herein. The memory chiplets 675 can be DRAM (e.g., GDDR, HBM) memory or cache (SRAM) memory.

Each chiplet can be fabricated as separate semiconductor die and coupled with the substrate 680 via an interconnect structure 673. The interconnect structure 673 may be configured to route electrical signals between the various chiplets and logic within the substrate 680. The interconnect structure 673 can include interconnects such as, but not limited to bumps or pillars. In some embodiments, the interconnect structure 673 may be configured to route electrical signals such as, for example, input/output (I/O) signals and/or power or ground signals associated with the operation of the logic, I/O and memory chiplets.

In some embodiments, the substrate 680 is an epoxy-based laminate substrate. The substrate 680 may include other suitable types of substrates in other embodiments. The package assembly 690 can be connected to other electrical devices via a package interconnect 683. The package interconnect 683 may be coupled to a surface of the substrate 680 to route electrical signals to other electrical devices, such as a motherboard, other chipset, or multi-chip module.

In some embodiments, a logic or I/O chiplet 674 and a memory chiplet 675 can be electrically coupled via a bridge 687 that is configured to route electrical signals between the logic or I/O chiplet 674 and a memory chiplet 675. The bridge 687 may be a dense interconnect structure that provides a route for electrical signals. The bridge 687 may include a bridge substrate composed of glass or a suitable semiconductor material. Electrical routing features can be formed on the bridge substrate to provide a chip-to-chip connection between the logic or I/O chiplet 674 and a memory chiplet 675. The bridge 687 may also be referred to as a silicon bridge or an interconnect bridge. For example, the bridge 687, in some embodiments, is an Embedded Multi-die Interconnect Bridge (EMIB). In some embodiments, the bridge 687 may simply be a direct connection from one chiplet to another chiplet.

The substrate 680 can include hardware components for I/O 691, cache memory 692, and other hardware logic 693. A fabric 685 can be embedded in the substrate 680 to enable communication between the various logic chiplets and the logic 691, 693 within the substrate 680. In one embodiment, the I/O 691, fabric 685, cache, bridge, and other hardware logic 693 can be integrated into a base die that is layered on top of the substrate 680. The fabric 685 may be a network on a chip interconnect or another form of packet switched fabric that switches data packets between components of the package assembly.

In various embodiments a package assembly 690 can include fewer or greater number of components and chiplets that are interconnected by a fabric 685 or one or more bridges 687. The chiplets within the package assembly 690 may be arranged in a 3D or 2.5D arrangement. In general, bridge structures 687 may be used to facilitate a point to point interconnect between, for example, logic or I/O chiplets and memory chiplets. The fabric 685 can be used to interconnect the various logic and/or I/O chiplets (e.g., chiplets 672, 674, 691, 693). with other logic and/or I/O chiplets. In one embodiment, the cache memory 692 within the substrate can act as a global cache for the package assembly 690, part of a distributed global cache, or as a dedicated cache for the fabric 685.

Figure 6D:
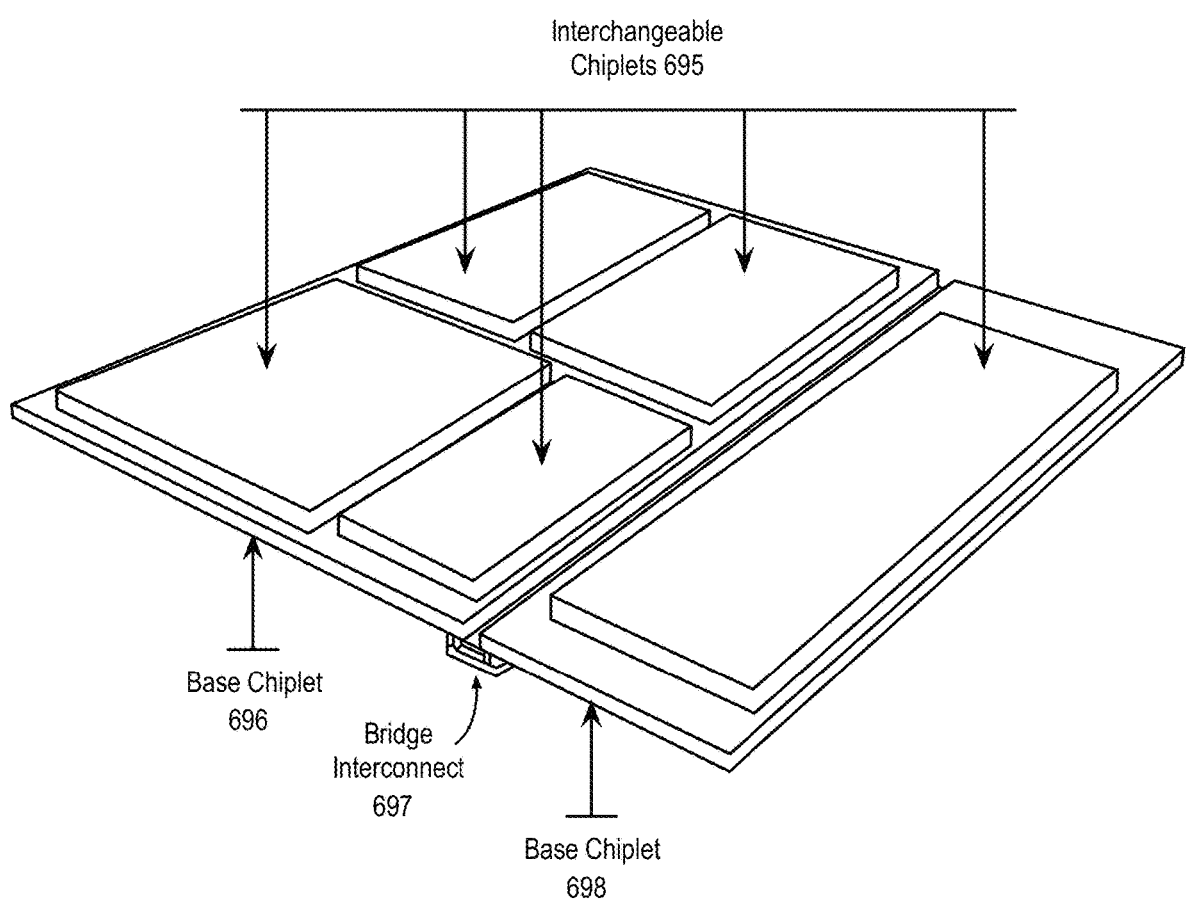
FIG. 6D illustrates a package assembly including interchangeable chiplets in accordance with some embodiments.

FIG. 6D illustrates a package assembly 694 including interchangeable chiplets 695, according to an embodiment. The interchangeable chiplets 695 can be assembled into standardized slots on one or more base chiplets 696, 698.

The base chiplets 696, 698 can be coupled via a bridge interconnect 697, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 696, 698, which can be fabricated using a different process technology relative to the interchangeable chiplets 695 that are stacked on top of the base chiplets. For example, the base chiplets 696, 698 can be fabricated using a larger process technology, while the interchangeable chiplets can be manufactured using a smaller process technology. One or more of the interchangeable chiplets 695 may be memory (e.g., DRAM) chiplets. Different memory densities can be selected for the package assembly 694 based on the power, and/or performance targeted for the product that uses the package assembly 694. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Example System on a Chip Integrated Circuit

Figure 7:
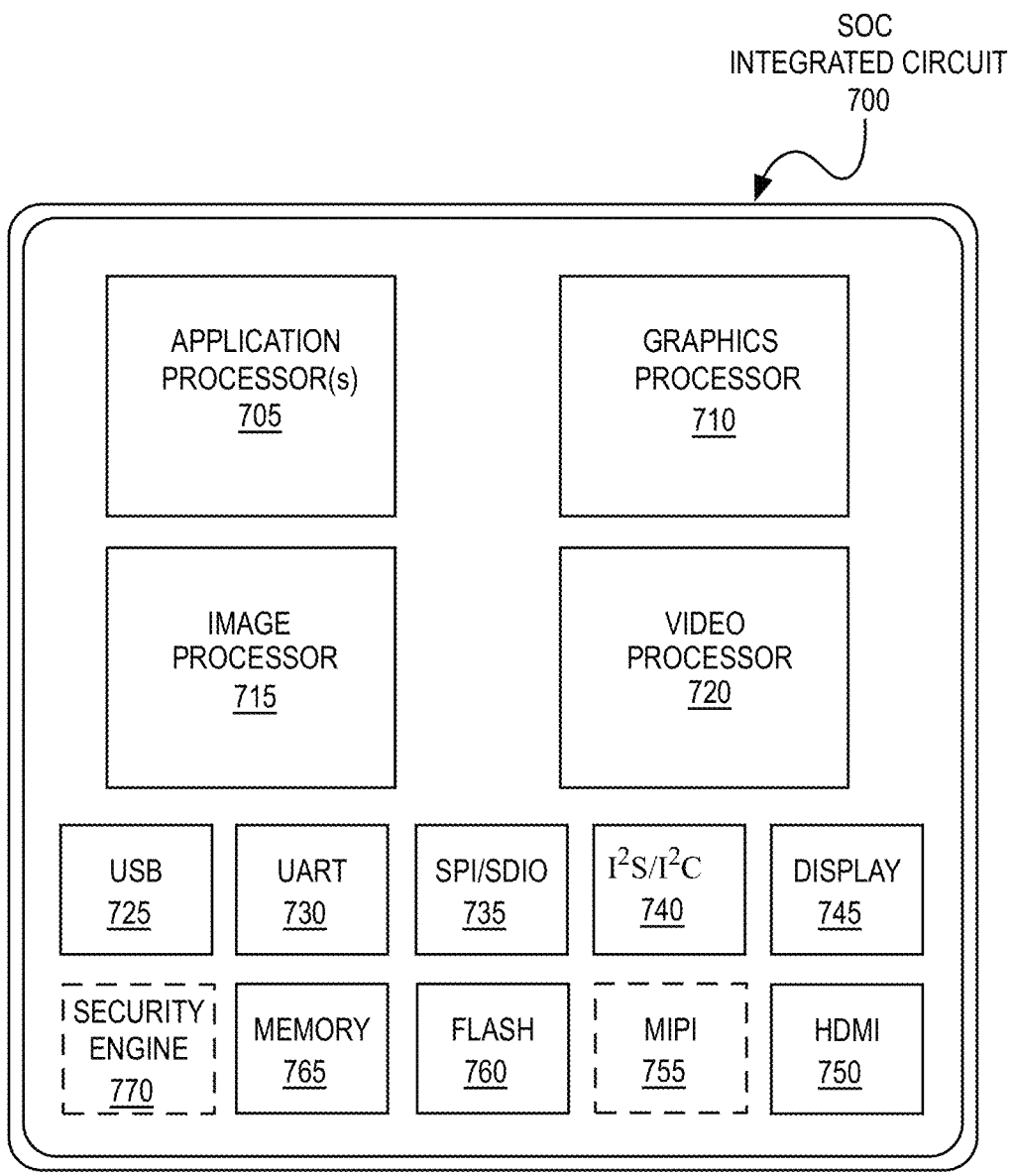
FIG. 7 is a block diagram illustrating an example system on a chip integrated circuit in accordance with some embodiments.

FIG. 7 illustrates an example integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 7 is a block diagram illustrating an example system on a chip integrated circuit 700 that may be fabricated using one or more IP cores, according to an embodiment. Example integrated circuit 700 includes one or more application processor(s) 705 (e.g., CPUs), at least one graphics processor 710, and may additionally include an image processor 715 and/or a video processor 720, any of which may be a modular IP core from the same or multiple different design facilities. Integrated circuit 700 includes peripheral or bus logic including a USB controller 725, UART controller 730, an SPI/SDIO controller 735, and an I²S/I²C controller 740. Additionally, the integrated circuit can include a display device 745 coupled to one or more of a high-definition multimedia interface (HDMI) controller 750 and a mobile industry processor interface (MIPI) display interface 755. Storage may be provided by a flash memory subsystem 760 including flash memory and a flash memory controller. Memory interface may be provided via a memory controller 765 for access to SDRAM or SRAM memory devices. Some integrated circuits additionally include an embedded security engine 770.

Figure 8:
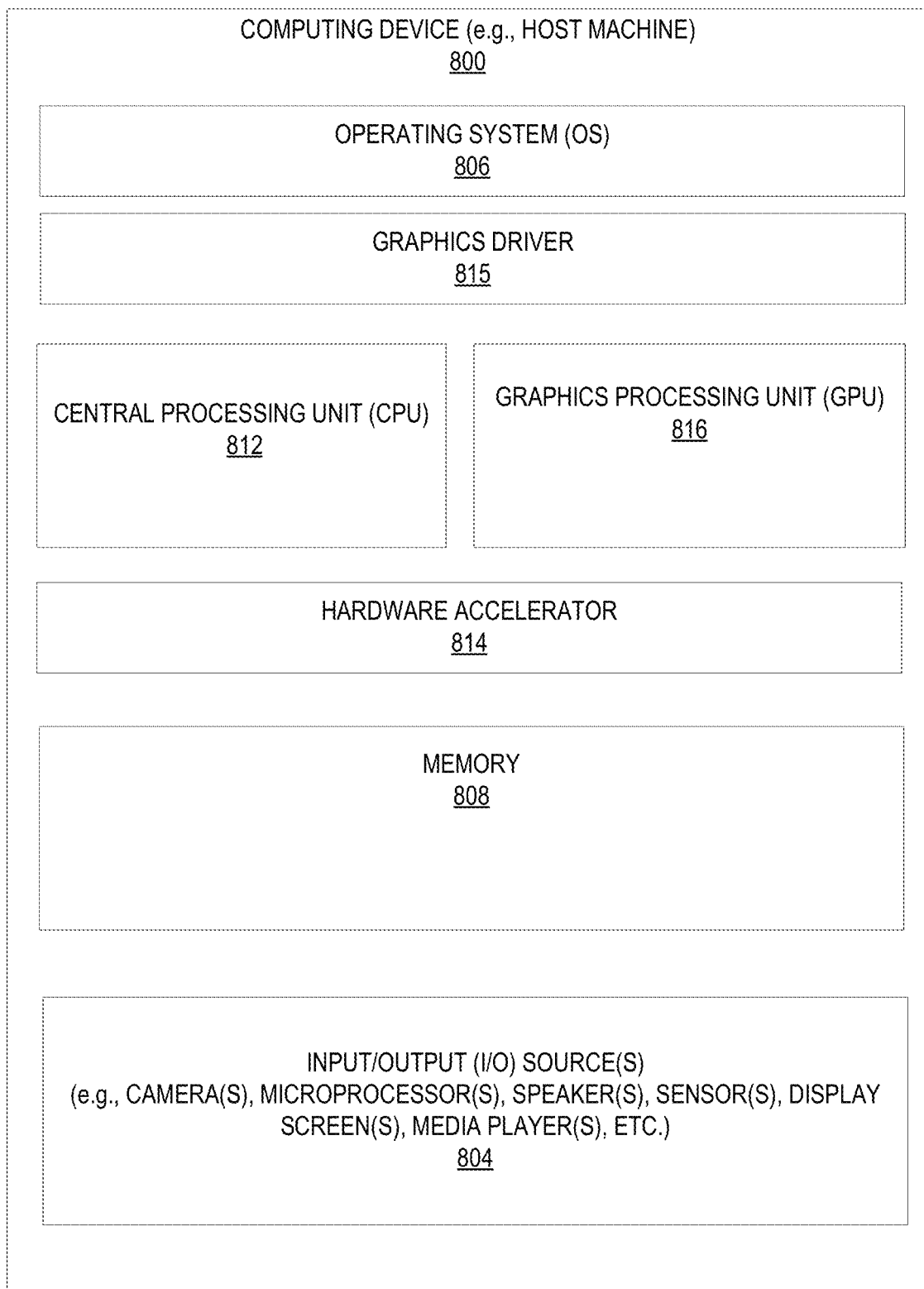
FIG. 8 illustrates a computing device according to implementations of the disclosure.

FIG. 8 illustrates a computing device 800 according to one implementation of the disclosure. Computing device 800 represents a communication and data processing device including or representing (without limitations) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet based cable television set-top boxes, etc.), global positioning system (GPS)-based devices, automotive infotainment devices, etc.

In some embodiments, computing device 800 includes or works with or is embedded in or facilitates any number and type of other smart devices, such as (without limitation) autonomous machines or artificially intelligent agents, such as a mechanical agents or machines, electronics agents or machines, virtual agents or machines, electromechanical agents or machines, etc. Examples of autonomous machines or artificially intelligent agents may include (without limitation) robots, autonomous vehicles (e.g., self-driving cars, self-flying planes, self-sailing boats, etc.), autonomous equipment self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 800 may include a computer platform hosting an integrated circuit ("IC"), such as a system on a chip ("SOC" or "SOC"), integrating various hardware and/or software components of computing device 800 on a single chip.

As illustrated, in one embodiment, computing device 800 may include any number and type of hardware and/or software components, such as (without limitation) graphics processing unit ("GPU" or simply "graphics processor") 816 (such as the graphics processors described above with respect to any one of FIGS. 1-7), graphics driver (also referred to as "GPU driver", "graphics driver logic", "driver logic", user-mode driver (UMD), user-mode driver framework (UMDF), or simply "driver") 815, central processing unit ("CPU" or simply "application processor") 812 (such as the processors or CPUs described above with respect to FIGS. 1-7), hardware accelerator 814 (such as an FPGA, ASIC, a re-purposed CPU, or a re-purposed GPU, for example), memory 808, network devices, drivers, or the like, as well as input/output (I/O) sources 804, such as touchscreens, touch panels, touch pads, virtual or regular keyboards, virtual or regular mice, ports, connectors, etc. Computing device 800 may include operating system (OS) 806 serving as an interface between hardware and/or physical resources of the computing device 800 and a user.

It is to be appreciated that a lesser or more equipped system than the example described above may be utilized for certain implementations. Therefore, the configuration of computing device 800 may vary from implementation to implementation depending upon numerous factors, such as price constraints, performance requirements, technological improvements, or other circumstances.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The terms "logic", "module", "component", "engine", "circuitry", "element", and "mechanism" may include, by way of example, software, hardware and/or a combination thereof, such as firmware.

Computing device 800 may host network interface device (s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface (s) may include, for example, a wireless network interface having antenna, which may represent one or more antenna (s). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMS, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 9:
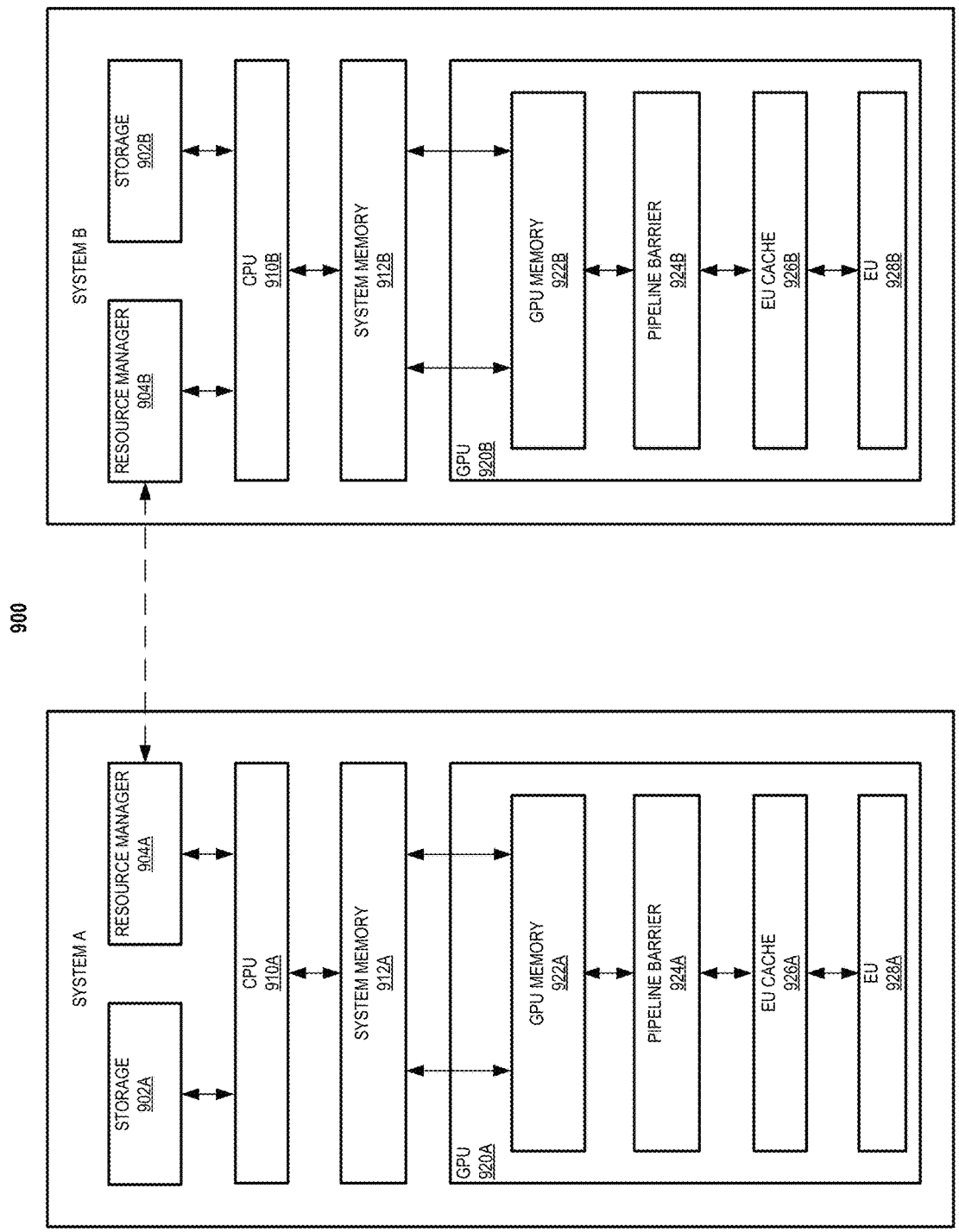
FIG. 9 illustrates a distributed computing platform, according to one implementation of the disclosure.

FIG. 9 illustrates a distributed computing platform 900, according to one implementation of the disclosure. As shown in FIG. 9, platform 900 includes computer systems A and B coupled via a network. In one embodiment, each system includes storage 902 (e.g., 902A and 902B), resources manager 904 (e.g., 904A and 904B), CPU 910 (e.g., 910A and 910B), system memory 912 (912A and 912B) and a GPU 920 (e.g., 920A and 920B). Each GPU 920 includes GPU memory 922 (e.g., 922A and 922B), pipeline barrier 924 (e.g., 924A and 924B), execution unit (EU) cache 926 (e.g., 926A and 926B) and one or more EUs 928 (e.g., 928A and 928B). According to one embodiment, systems A and B may be configured to perform distributed workload processing (e.g., rendering) of a workload by sharing execution of the workload. In such an embodiment, a system may render a single workload using a local GPU 920 and request the other system to execute additional computation for the workload. For example, system A can render a workload using GPU 920A and request system B to execute additional computation using the output from GPU 920A.

Figure 10:
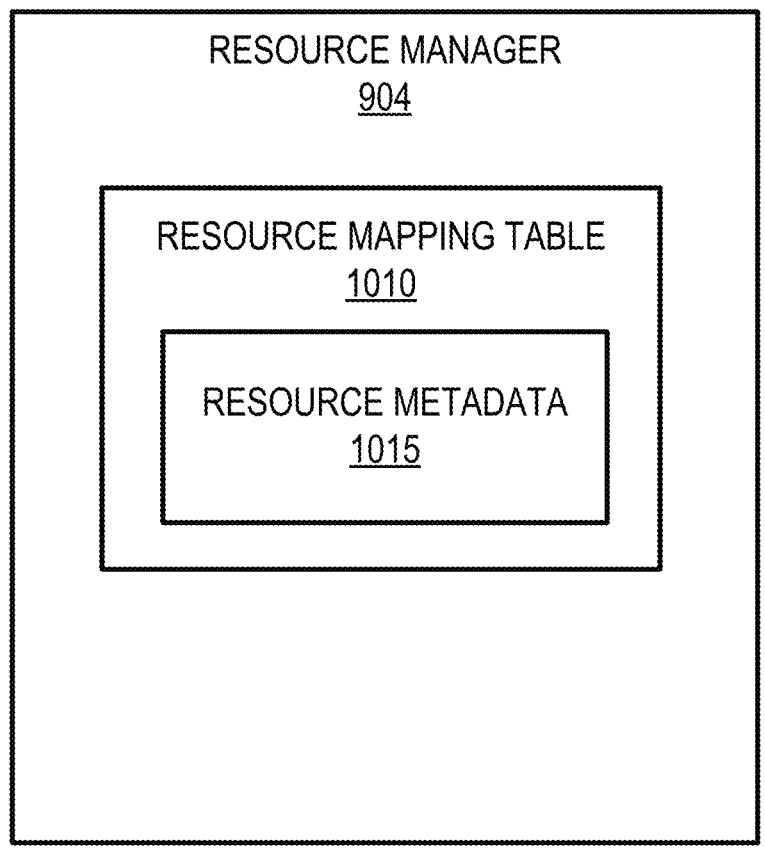
FIG. 10 illustrates one embodiment of a resource manager.

In one embodiment, resource managers 904 is implemented to enable distributed rendering. FIG. 10 illustrates one embodiment of a resource manager 904. Resources manager 904 includes a resource mapping table 1010, which is used to track metadata 1015 for each static resource loaded from storage 902, or dynamic resources updated by CPU 910 or GPU 920. To prepare for distributed rendering a system (e.g., system A) generates mapping table 1010. As used herein, a resource is defined as a physical or virtual component (e.g., memory, cache, EUs, etc.) within system A and/or system B.

FIG. 11 illustrates one embodiment of resource metadata managed by a resource manager 904. A source identifier (or Source ID) represents a local ID (or handle) of a resource from an source system (e.g., system A), while a destination ID is an identifier assigned at the destination system (e.g., System B) when an aliased GPU resource is created for this resource. A static/dynamic flag indicates whether a resource is a read only static resource, or whether the resource can be dynamically updated by an application. Page #points to a list of pages that needs to be copied from the source system to the destination system. Source submitted #denotes the ID of the last write operation (or write) submitted by the source system. Source completed #denotes the last write completed operation by the source system (e.g., a fence counter). Similarly, the destination submitted #denotes the ID of the last write submitted by the destination system, and the destination completed #denotes the last write completed by the destination system. The latency information is updated based on a round trip latency in transferring the data from the source system to the destination system.

Figure 12:
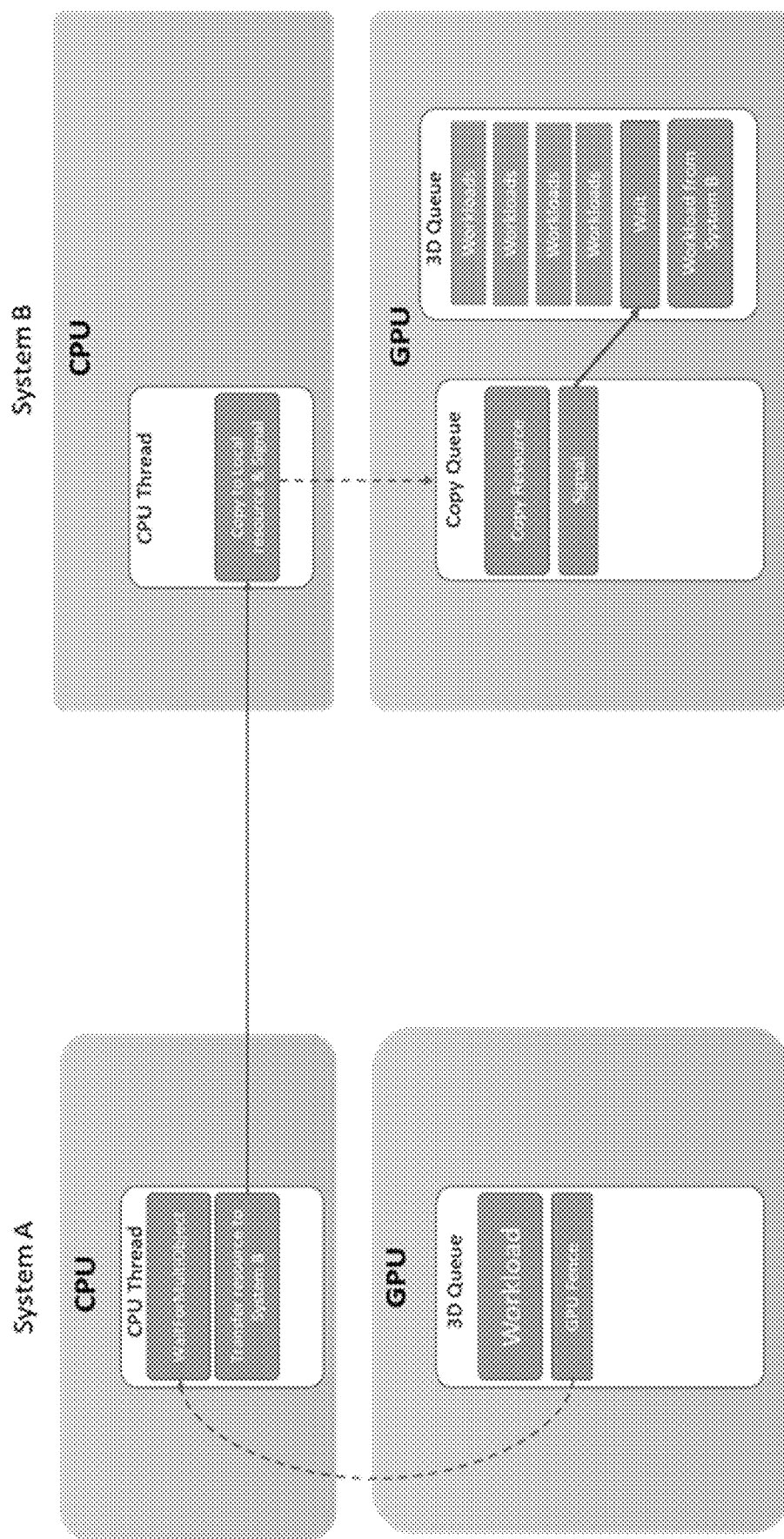
FIG. 12 illustrates another embodiment of a computing platform.

According to one embodiment, an application executing in a source system can submit API command streams to process a workload to the destination source system, along with a value (e.g., Source Last Submitted #value) while the GPU 920 in the source system is generating data to transfer to the destination system. Upon receiving the API command streams from the source system, the destination system analyzes the required resource to process the command buffer, and determines whether a source submitted #value for any resource is less than the local metadata entry. If so, the destination system inserts a barrier to wait until a resource is received from the source system followed by API steams from the source system prior to submitting a workload to a 3D engine or compute queue. GPU 920 in the destination system will continue to execute any previous commands in the command queue. Once the required resource is received from the source system, the destination system copies the resource to the local copy of the destination system and signal" the 3D engine or compute queue to continue. FIG. 12 illustrates another embodiment of the computing platform performing the above-described process.

Figure 13:
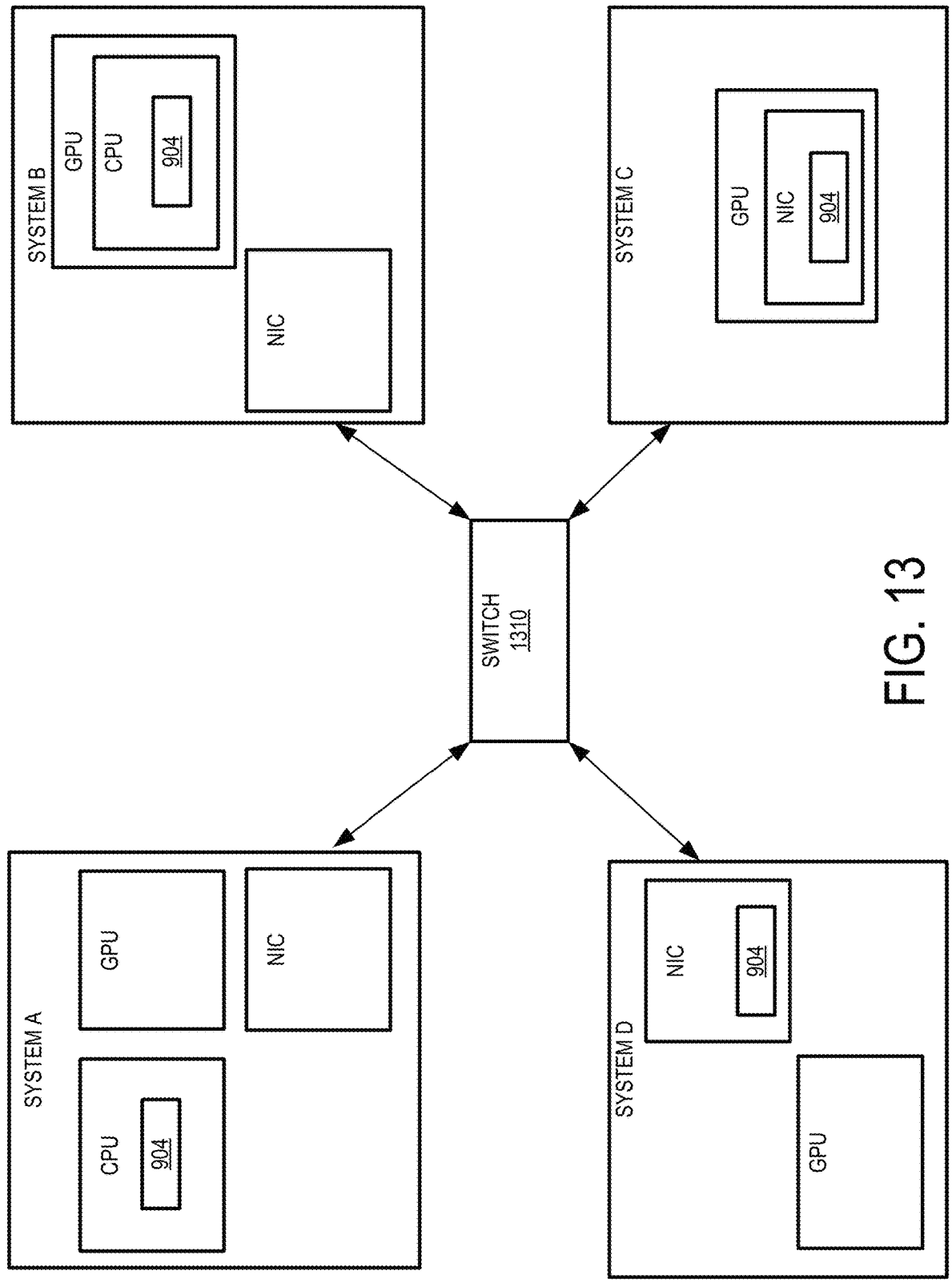
FIG. 13 illustrates yet another embodiment of a computing platform.

Although described above as being a separate system components, other embodiments may feature resource managers implemented in various configurations. For example, FIG. 13 illustrates yet another embodiment of a computing platform including different resource manager configurations. As shown in FIG. 13, systems A-D are coupled via a switch 1310, and include resources managers 904 included in one or more CPUs, GPUs or network interface controllers (NICs).

Figure 14A:
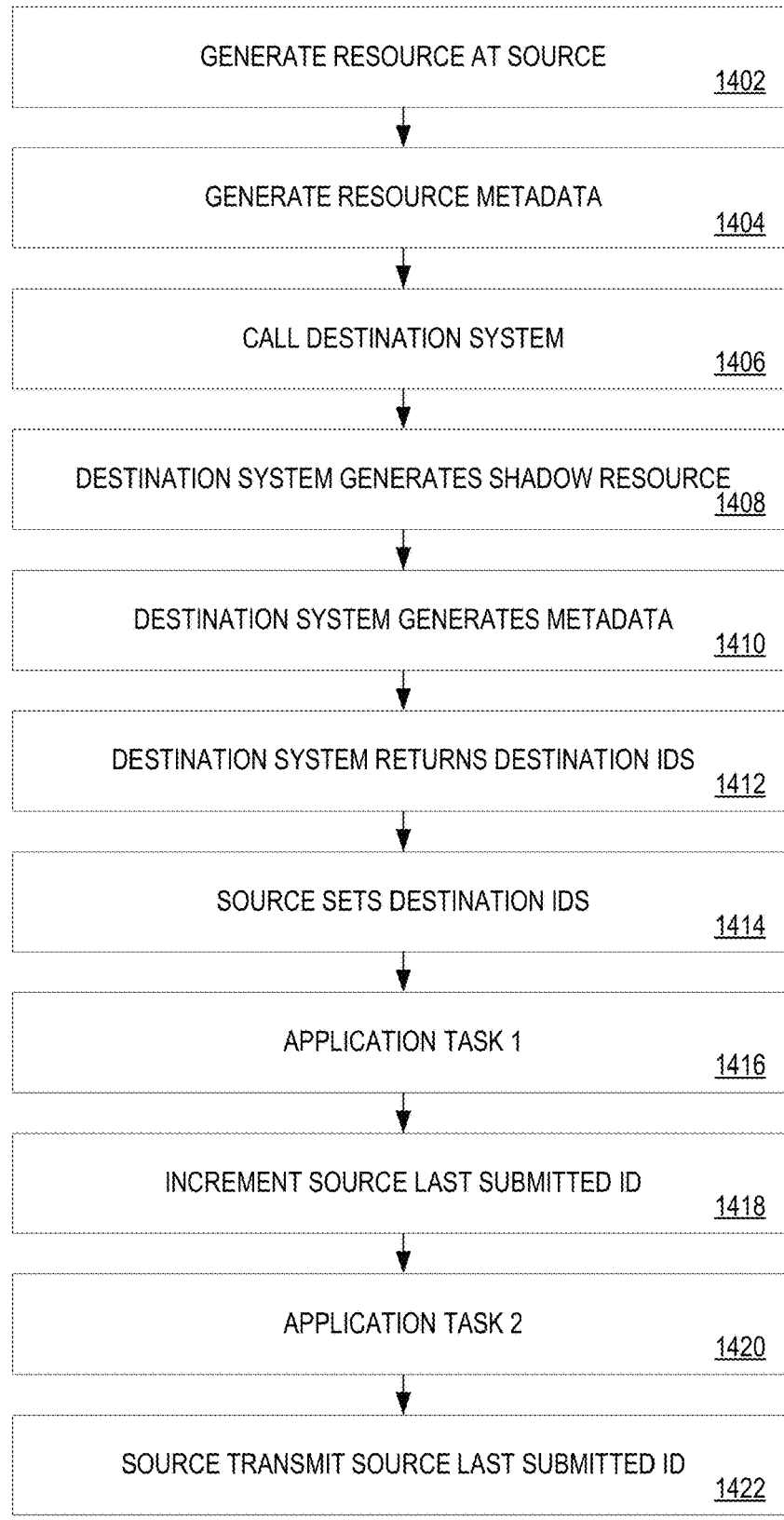
FIGS. 14A and 14B are flow diagrams illustrating one embodiment of a process for performing distributed rendering.
Figure 14B:
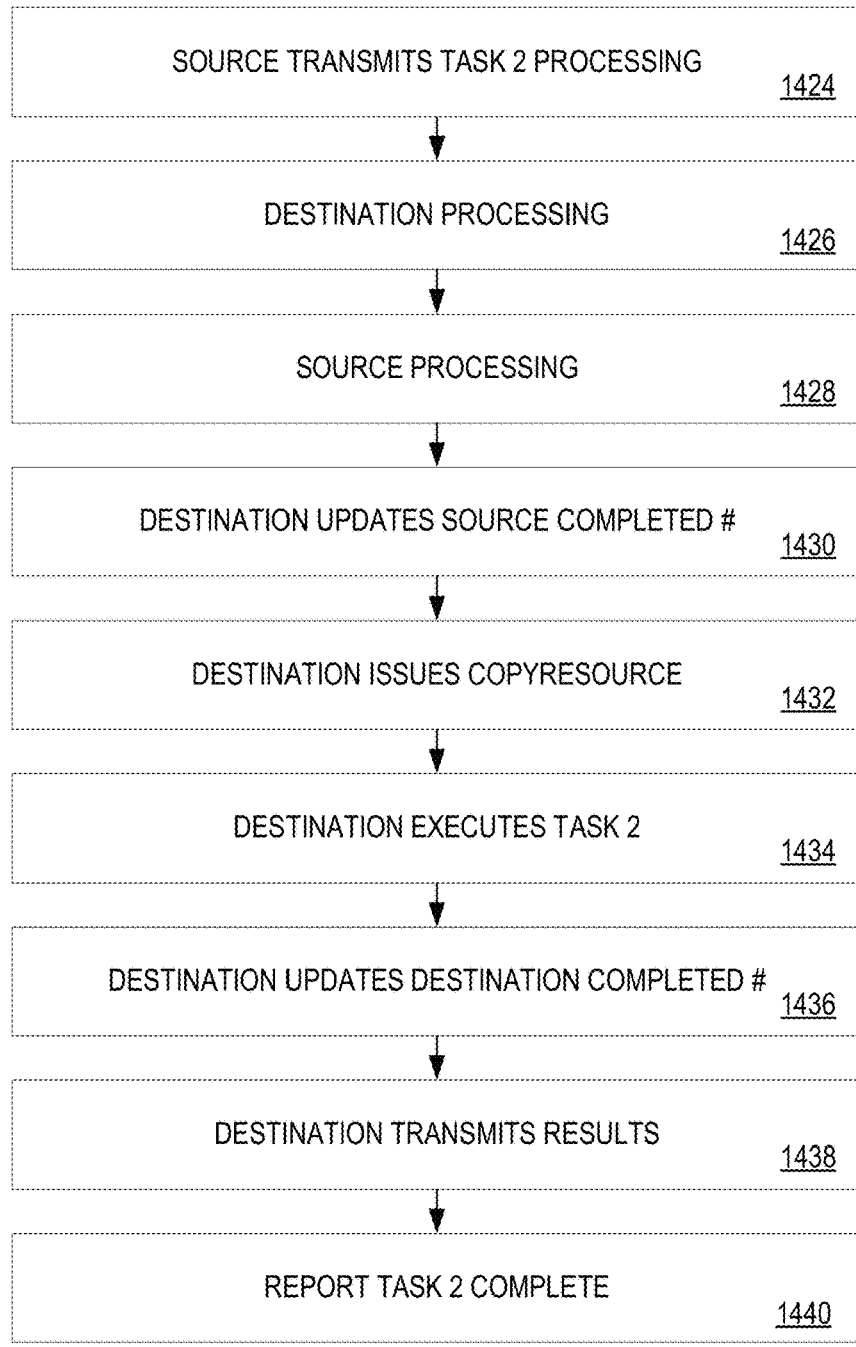

FIGS. 14A and 14B are flow diagrams illustrating one embodiment of a process for performing distributed rendering. At processing block 1402 (FIG. 14A), an application executing (or running) in the source system (e.g., system A) generates resources (e.g., R1 & R2). At processing block 1404, the source resource manager (e.g., RMA) generates the resource metadata for R1 (SystemA-R1-MetaData) & R2 (SystemA-R2-MetaData). At processing block 1406, RMA transmits a call (or calls) to the destination system (e.g., system B) to generate shadow resources for R1 & R2. At processing block 1408, the destination resource manager (e.g., RMB) generates the shadow resource within its GPU. In one embodiment, a shadow resource comprises a local GPU copy of a remote resource.

At processing block 1410, RMB generates a resource metadata for R1 (SystemB-R1-MetaData) & R2 (SystemB-R1-MetaData). At processing block 1412, RMB returns destination IDs to RM-A for R1 and R2. At processing block 1414, RMA sets the destination IDs for R1 and R2. At processing block 1416, the application calls the source system to run Task1 in GPU and store the result in R1. At processing block 1418, the source last submitted #in SystemA-R1-MetaData is incremented. At processing block 1420, the application calls the source system to execute Task 2 (e.g., read R1 and compute results to R2). At processing block 1422, transmits the source last submitted ID of R1 to RMB.

At processing block 1424 (FIG. 14B), RMA transmits Task 2 to RMB along with last submitted #of R1 to submit to the destination GPU. However, at this point the resource has yet to be updated. At processing block 1426, RMB processing is performed. In one embodiment, the RMB processing comprises setting source last submitted IDs of R1 in SystemB-R1-MetaData, submitting a wait command in the GPU 3D queue upon a determination that R1 needs to be updated (e.g., source submitted #is less than source completed #), submitting Task2 to the GPU and incrementing destination submitted #for R1.

Figure 15:
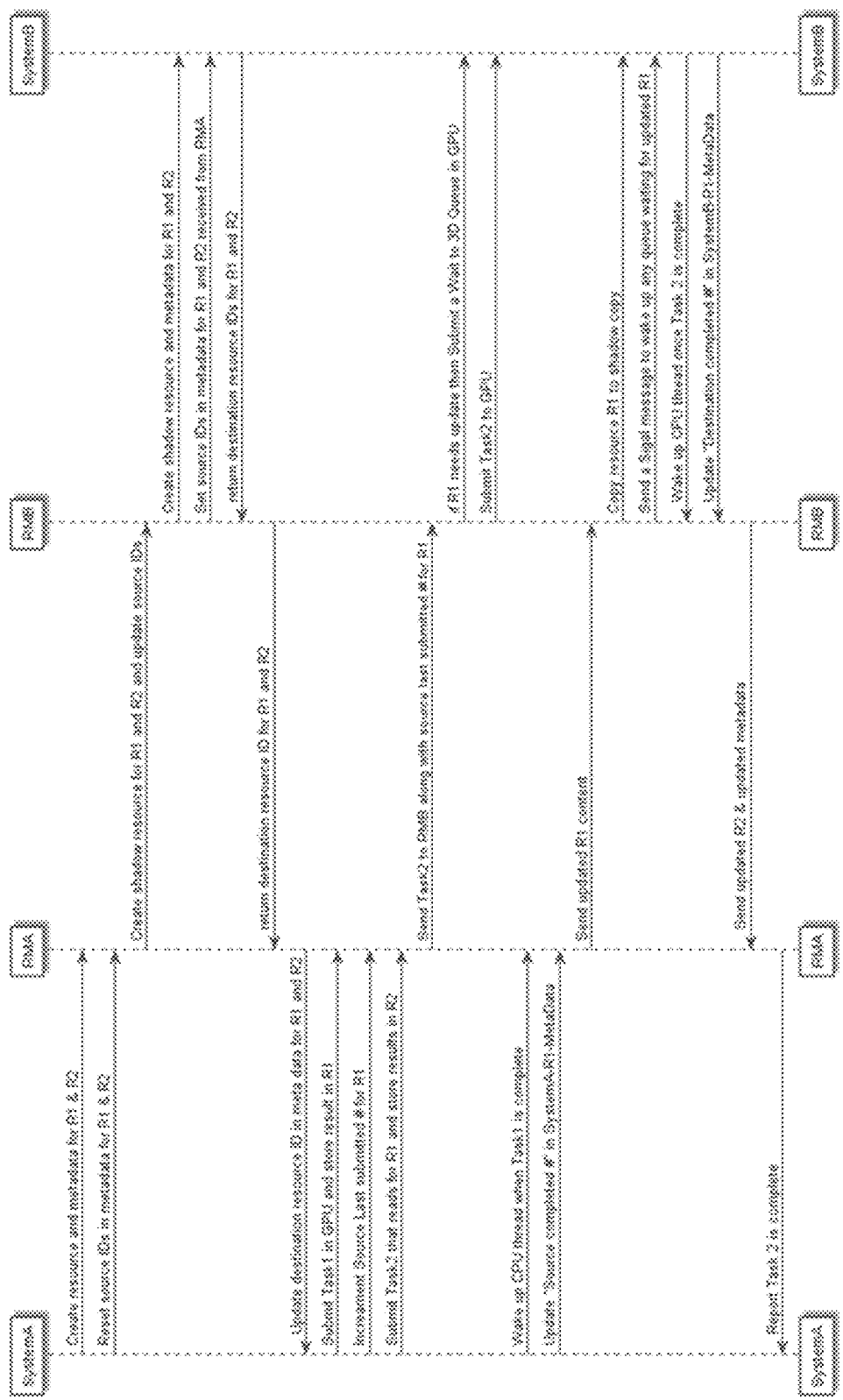
FIG. 15 is a sequence diagram illustrating one embodiment of a resource management process.

At processing block 1428, RMA processing is performed. In one embodiment the RMA processing comprises updating the source completed #in SystemA-R1-MetaData after Task1 has been completed and streaming the updated R1 to RMB. At processing block 1430, RMB updates "source completed #" in SystemB-R1-MetaData. At processing block 1432, RMB issues a CopyResource and Signal to its GPU. At processing block 1434, the destination GPU executes Task 2 upon Signal being executed on the copy queue. At processing block 1436, RMB updates destination completed #once Task2 is complete. At processing block 1438, RMB transmits the results of Task 2 (Updated R2) to RM-A along with updated metadata. At processing block 1440, the source system reports Task 2 is complete. FIG. 15 is a sequence diagram illustrating one embodiment of a resource management process.

Platform Security

For confidential GPU computing in systems A and B, it is necessary to ensure the confidentiality and integrity of user data that is offloaded to a GPU and during execution within the GPU, as well as the integrity of the GPU control plane (e.g., command queues and associated data structures). System software, such as device drivers, the OS, and the VMM are outside the trust boundary. According to one embodiment, system applications and the userspace GPU stack (runtime, drivers, and resource manager) are hosted within trusted execution environment a TEE, similar to discussed above with reference to FIG. 2.

However, to additionally protect the confidentiality and integrity of CPU-CPU and CPU-GPU communications in platform 900, secure channels must be set up between various endpoints. Thus, prior to the secure channels being set up, the various nodes (CPUs and GPUs) in the dynamically composed system attest to the application that relies on the nodes to perform various computational tasks. According to one embodiment, each node in the platform (e.g., CPU 910A, CPU 910B, GPU 920A and GPU 920B) directly communicate with and mutually attest to establish a secure channel. As a result, CPU 910A, CPU 910B, GPU 920A and GPU 920B all establish a secure channel between them.

Once attestation has been performed, one node in the system (e.g., CPU 910A) is designated the master node. In such an embodiment, the master node generates a node ID for every node in the system. The master node also generates a master key that is propagated to various nodes in the system over previously established secure channels. For example, CPU 910A may generate node IDs 1, 2, 3, and 4 for CPU 910A, CPU 910B, GPU 920A and GPU 920B, respectively. In yet a further embodiment, the also master node shares the master key with GPU 920A and CPU 910B, which in turn shares the master key with GPU 920B. Thus, whenever a node (i) needs to communicate with a node (j) in this system, node (i) encrypts (and integrity-protects) the data to be communicated with a key Kj derived from the master key K and node ID of the recipient node (j) using a Key Derivation Function (KDF).

Based on the architecture described in FIG. 9, when CPU 910A writes the commands to the 3D queue for GPU 920A, CPU 910A instructs 920A that the intended recipient of resource R1 is GPU 920B (identified node ID 4). The command queues and data flowing between CPU 910A and GPU 920A are protected with key K2 (ID of GPU 920A is 2) derived from K. Thus, when GPU 920A produces R1, it encrypts R1 with key K4 (for GPU 920B). The resource passes through CPU 910A onto host memory of CPU 910B without requiring any decryption and re-encryption. Finally, when CPU 910B writes to the Copy queue for GPU 920B, it encrypts and integrity-protects the commands with key K4. The copy command references R1 in CPU 910B host memory and automatically decrypts R1 with K4 when copied into the GPU 920B memory.

Similarly, the 3D queue on GPU 920B includes a command that instructs GPU 920B that the generated results must be encrypted with key K1 since the intended recipient is CPU 910A. Once the GPU 920B completes the computation, the results may be transmitted to CPU 910A without additional cryptographic operations on CPU 910B. Resource metadata flowing from CPU 910A to CPU 910B is encrypted with K2 and any telemetry data from System B to A is encrypted with K1. Thus, the confidentiality and integrity of data in the distributed, heterogeneous system is protected in a scalable and efficient manner.

Flowcharts representative of example hardware logic, machine readable instructions, hardware implemented state machines, and/or any combination thereof for implementing the systems, already discussed. The machine readable instructions may be one or more executable programs or portion(s) of an executable program for execution by a computer processor. The program may be embodied in software stored on a non-transitory computer readable storage medium such as a CD-ROM, a floppy disk, a hard drive, a DVD, a Blu-ray disk, or a memory associated with the processor, but the whole program and/or parts thereof could alternatively be executed by a device other than the processor and/or embodied in firmware or dedicated hardware. Further, although the example program is described with reference to the flowcharts illustrated in the various figures herein, many other methods of implementing the example computing system may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may utilize one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but utilize addition of a library (e.g., a dynamic link library (DLL)), a software development kit (SDK), an application programming interface (API), etc. in order to execute the instructions on a particular computing device or other device. In another example, the machine readable instructions may be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5 and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments. Some embodiments pertain to Example 1 that includes a computing platform comprising a first computer system comprising a first graphics processing unit (GPU), a network coupled to the first computer system and a second computer system, coupled to the first computer system via the network, comprising a second GPU, wherein the first and second computer system are configured to perform distributed processing of graphics workloads between the first GPU and the second GPU.

Example 2 includes the subject matter of Example 1, wherein the first computer system comprises a source system and the second computer system comprises a destination system.

Example 3 includes the subject matter of Examples 1 and 2, wherein the source system and the destination system each comprise a resource manager including a mapping table to track metadata associated with resources that are to be processed at the source system and the destination system.

Example 4 includes the subject matter of Examples 1-3, wherein an application executing in the source system generates resources and the source resource manager generates metadata associated with the resources.

Example 5 includes the subject matter of Examples 1-4, wherein the source system transmits a call to the destination system to generate shadow resources corresponding to the resources in the second GPU.

Example 6 includes the subject matter of Examples 1-5, wherein the destination system generates the shadow resources and the destination resource manager generates metadata associated with the shadow resources.

Example 7 includes the subject matter of Examples 1-6, wherein the application calls the source system to execute a first task at the first GPU and store the result in a first resource.

Example 8 includes the subject matter of Examples 1-7, wherein the application calls the source system to execute a second task based on the first resource and store the result in a second resource.

Example 9 includes the subject matter of Examples 1-8, wherein the source resource manager transmits the second task to the destination resource manager.

Example 10 includes the subject matter of Examples 1-9, wherein the second task is executed at the second GPU and the destination resource manager transmits the results to the source resource manager.

Some embodiments pertain to Example 11 that includes a method to facilitate secure communication between a plurality of nodes in a computing platform comprising determining, at a first of the plurality of nodes, a second of the plurality of nodes that is to receive resource data, encrypting the resource data with a key derived from a master key and a node identifier associated with the second node and transmitting the encrypted resource data to the second node.

Example 12 includes the subject matter of Example 11, wherein the key is generated via a key derivation function.

Example 13 includes the subject matter of Examples 11 and 12, further comprising selecting a master node from the plurality of nodes.

Example 14 includes the subject matter of Examples 11-13, further comprising generating the master key at the master node.

Example 15 includes the subject matter of Examples 11-14, further comprising the master node transmitting the master key to each of the plurality of nodes.

Example 16 includes the subject matter of Examples 11-15, further comprising generating a node identifier associated with each of the plurality of nodes at the master node.

Some embodiments pertain to Example 17 that includes at least one computer readable medium having instructions stored thereon, which when executed by one or more processors, cause the processors to determine, at a first of a plurality of nodes, a second of the plurality of nodes that is to receive resource data, encrypt the resource data with a key derived from a master key and a node identifier associated with the second node and transmit the encrypted resource data to the second node.

Example 18 includes the subject matter of Example 11, having instructions stored thereon, which when executed by one or more processors, further cause the processors to select a master node from the plurality of nodes.

Example 19 includes the subject matter of Examples 11 and 12, having instructions stored thereon, which when executed by one or more processors, further cause the processors to generate the master key at the master node and transmit the master key to each of the plurality of nodes.

Example 20 includes the subject matter of Examples 17-19, having instructions stored thereon, which when executed by one or more processors, further cause the processors to generate a node identifier associated with each of the plurality of nodes at the master node.

The foregoing description and drawings are to be regarded in an illustrative rather than a restrictive sense. Persons skilled in the art can understand that various modifications and changes may be made to the embodiments described herein without departing from the broader spirit and scope of the features set forth in the appended claims.

What is claimed is:

1. A computing platform comprising:
   a first computer system operating as a source system comprising:
   a first graphics processing unit (GPU) coupled to a second computer system operating as a destination system via a network, wherein the first GPU shares processing of graphics workloads with a second GPU at the second computer system; and
   a central processing unit (CPU) to execute a resource manager to track metadata associated with resources at the source system and the destination system to execute the graphics workloads, wherein the metadata comprises a flag to indicate whether a resource includes a read-only static resource or is dynamically updated by an application.

2. The computing platform of claim 1, wherein the metadata comprises a source identifier (source ID) that represents a local ID of a resource from the source system and a destination ID assigned at the destination system when a GPU resource is created for the resource.

3. The computing platform of claim 1, wherein the CPU in the source system executes an application to generate the resources and the source resource manager generates the metadata associated with the resources.

4. The computing platform of claim 3, wherein the source system transmits a call to the destination system to generate shadow resources corresponding to the resources in the first GPU.

5. The computing platform of claim 4, wherein the destination system generates the shadow resources and the destination resource manager generates metadata associated with the shadow resources.

6. The computing platform of claim 5, wherein the application calls the source system to execute a first task at the first GPU and store a result in a first resource.

7. The computing platform of claim 6, wherein the application calls the source system to execute a second task based on the first resource and store the result in a second resource.

8. The computing platform of claim 7, wherein the source resource manager transmits the second task to the destination resource manager.

9. The computing platform of claim 8, wherein the second task is executed at the second GPU and the destination resource manager transmits the results to the source resource manager.

10. The computing platform of claim 1, wherein the first GPU performs a first operation on a graphics workload and the second GPU performs a second operation on the graphics workload.

11. A method comprising:
receiving a graphics workload at first graphics processing unit (GPU) within a first computer system operating as a source system;
performing a first operation on the graphics workload at the first GPU;
transmitting a second operation on the graphics workload to a second GPU at a second computer system operating as a destination system; and
tracking metadata associated with resources to execute the graphics workloads at the source system and the destination system at one or more central processing units (CPUs), wherein the metadata comprises a flag to indicate whether a resource includes a read-only static resource or is dynamically updated by an application.

12. The method of claim 11, wherein the metadata comprises a source identifier (source ID) that represents a local ID of a resource from the source system and a destination ID assigned at the destination system when a GPU resource is created for the resource.

13. The method of claim 11, further comprising:
generating the resources; and
generating the metadata associated with the resources.

14. The method of claim 13, further comprising transmitting a call to the second computing system to generate shadow resources corresponding to the resources in the first GPU.

15. At least one computer readable medium having instructions stored thereon instructions which, when executed, cause a computing device to perform operations comprising:
receiving receive a graphics workload at first graphics processing unit (GPU) within a first computer system operating as a source system;
transmitting transmit a first operation on the graphics workload at the first GPU;
performing perform a second operation on the graphics workload to a second GPU at a second computer system operating as a destination system; and
tracking track metadata associated with resources that are to execute the graphics workloads at the source system and the destination system at one or more central processing units (CPUs), wherein the metadata comprises a flag to indicate whether a resource includes a read-only static resource or is dynamically updated by an application.

16. The computer readable medium of claim 15, wherein the metadata comprises a source identifier (source ID) that represents a local ID of a resource from the source system and a destination ID assigned at the destination system when a GPU resource is created for the resource.

17. The computer readable medium of claim 15, wherein the operations further comprise:
generating generate the resources; and
generating generate the metadata associated with the resources.

18. The computer readable medium of claim 17, wherein the operations further comprise transmitting a call to the second computing system to generate shadow resources corresponding to the resources in the first GPU.

* * * * *